United States Patent
Hazel et al.

(10) Patent No.: US 11,468,031 B1
(45) Date of Patent: Oct. 11, 2022

(54) METHODS AND APPARATUS FOR EFFICIENTLY SCALING REAL-TIME INDEXING

(71) Applicant: CHAOSSEARCH, INC., Andover, MA (US)

(72) Inventors: Thomas Hazel, Boston, MA (US); David Noblet, Londonderry, NH (US); Jake Kinsella, Boston, MA (US)

(73) Assignee: CHAOSSEARCH, INC., Andover, MA (US)

( * ) Notice: Subject to any disclaimer, the term of this patent is extended or adjusted under 35 U.S.C. 154(b) by 0 days.

(21) Appl. No.: 17/548,425

(22) Filed: Dec. 10, 2021

(51) Int. Cl.
*G06F 16/22* (2019.01)
*G06F 16/23* (2019.01)
*G06F 11/34* (2006.01)
*G06F 16/2453* (2019.01)

(52) U.S. Cl.
CPC ...... *G06F 16/2272* (2019.01); *G06F 11/3409* (2013.01); *G06F 16/2358* (2019.01); *G06F 16/2393* (2019.01); *G06F 16/2453* (2019.01)

(58) Field of Classification Search
CPC ............ G06F 16/2272; G06F 11/3409; G06F 16/2358; G06F 16/2393; G06F 16/2453
USPC ........................................................ 707/741
See application file for complete search history.

(56) References Cited

U.S. PATENT DOCUMENTS

| | | | | |
|---|---|---|---|---|
| 5,701,469 A * | 12/1997 | Brandli | ................. | G06F 16/316 707/999.102 |
| 8,126,895 B2 * | 2/2012 | Sargent | ................... | G06F 16/31 707/711 |
| 8,898,139 B1 * | 11/2014 | Philbin | ................. | G06F 16/583 707/711 |
| 10,496,494 B1 * | 12/2019 | Haloi | ..................... | G06F 16/148 |
| 10,721,167 B1 * | 7/2020 | Bosshart | ............... | H04L 49/103 |
| 11,126,622 B1 * | 9/2021 | Hazel | ................ | G06F 16/24539 |
| 2007/0244865 A1 * | 10/2007 | Gordon | ................. | G06F 16/252 |
| 2014/0150019 A1 * | 5/2014 | Ma | ........................ | H04N 21/458 725/34 |
| 2015/0095461 A1 * | 4/2015 | McGowan | ....... | H04N 21/44016 709/219 |
| 2015/0178335 A1 * | 6/2015 | Faitelson | ................ | G06F 16/41 707/741 |
| 2015/0220620 A1 * | 8/2015 | Arana | .................... | G06F 16/316 707/741 |

(Continued)

*Primary Examiner* — Phuong Thao Cao
(74) *Attorney, Agent, or Firm* — Procopio, Cory, Hargreaves & Savitch LLP

(57) ABSTRACT

Apparatus, methods, and computer-readable media facilitating efficiently scaling real-time indexing are disclosed herein. An example method includes generating a first plurality of source data objects based on source files having data received at the object storage system. The example method also includes generating one or more real-time manifest files based on the first plurality of source data objects. Additionally, the example method includes updating the index to include the one or more real-time manifest files. The example method also includes receiving a search query for at least one of the first plurality of source data objects and the second plurality of source data objects stored at the object storage system. Additionally, the example method includes generating a materialized view of a result set of the search query based on querying the index based on the search query, the manifest file, and the one or more real-time manifest files.

20 Claims, 12 Drawing Sheets

(56) References Cited

U.S. PATENT DOCUMENTS

| | | | |
|---|---|---|---|
| 2017/0142180 A1* | 5/2017 | McGowan | H04N 21/242 |
| 2018/0067878 A1* | 3/2018 | Feng | G06F 12/023 |
| 2019/0065545 A1* | 2/2019 | Hazel | G06F 16/2455 |
| 2019/0236174 A1* | 8/2019 | Weber | G06F 16/21 |
| 2019/0266170 A1* | 8/2019 | Hazel | G06F 16/13 |
| 2021/0133026 A1* | 5/2021 | Horn | G06F 11/1076 |

* cited by examiner

METHODS AND APPARATUS FOR EFFICIENTLY SCALING REAL-TIME INDEXING

INTRODUCTION

The present disclosure relates generally to the field of object storage, and, more particularly, to methods and apparatus for efficiently scaling real-time indexing.

Object storage is a type of data storage architecture that manages data as objects, which has become popular due to its prevalence in cloud storage services. Object storage may be considered a form of a distributed key/value storage service, where keys (unique indexes) and values (opaque data) are accessed via PUT, GET, and LIST interfaces. Consequently, such data is copied out to do a variety of processing and/or analysis, where the results of this external execution is often put right back into object storage. The cycle of Extracting, Transforming, and Loading (ETL) data is a large part of the data storage and management problem, though not the only issue. The advantages of object storage are its simplicity and scalability, encouraging cloud based storage services to be used as data lake repositories, where any type of data of any scale can be stored with the belief that value can be derived at a later date. However, this can lead to data being stored in a disjoined, disparate, and schema-less manner. Frequently, this unstructured data is irregular, malformed, and chaotic, which is a direct result of object storage constructs.

Knowing what has been stored in object storage (e.g., "what is in your buckets") is another issue. In other words, understanding "what" to extract and "how" to extract information from stored data is a major step before an ETL operation can be performed. The ability to group information into "like" subsets is important to efficiently use object storage. However, once this information has been identified, the actual data analysis is yet another significant hurdle to overcome. Analysis of such disjoined, disparate, or malformed data may be processed either through manual inspection via scaffolding such as via Hadoop™ (raw data) or through manual transformation for analytic services such as Amazon Redshift™ (tabular data) and/or Elastic™ (text data). Manual inspection and manual transformation are each time consuming, complicated, and costly, and may contribute to the failures of "data lakes."

Caching is a technique to improve response time. Caching may be used in a variety of applications and scenarios, such as serving website page requests to presenting query results from a database. Example scenarios in which a system may enable caching include when second to sub-second request times are needed or when an ability to increase the number of requests per second is required (e.g., due to database limits), among others.

With respect to databases, caching of information may improve database query performance. An example aspect of caching is the use of memory access versus disk access. For example, performance of memory access may be magnitudes faster when storing the results of a previous request. However, example drawbacks of using memory include the cost of the memory and the volatile nature of memory. While disk access times have improved (e.g., from tapes to hard-disk drives (HDDs) to solid state drives (SSDs) to flash memory), disks have not reached the design performance of memory, such as random access memory (RAM). Additionally, while object storage, such as AWS Simple Storage Service (S3)™ made available by Amazon, has reduced the cost and complexity of durable storage compared to traditional storage mediums, some object storage systems have reversed some of the previously achieved performance gains, for example, obtained by SSD and flash memory.

Real-time indexing (e.g., access to new data in less than a threshold interval, such as five seconds) may be beneficial for big data scenarios (e.g., terabyte (TB) or petabyte (PB) datasets) in which large quantities of data are ingested by a database. However, making the ingested data available for access (e.g., providing query responses) in real-time may place heavy demands on such database solutions. To build such a real-time system at scale may be resource intensive, for example, with respect to time, cost, processing resources, and/or complexity.

SUMMARY

Aspects presented herein provide solutions to these problems, enabling such functionality to be embedded directly into object storage and, thus, making object storage smarter and more capable. Aspects include real-time indexing to make data available for analysis as quickly as possible while reducing the resources (e.g., time, cost, processing resources, and/or complexity) associated with real-time systems. That is, aspects disclosed herein enable improved performance, reduced latency, and improved scalability associated with real-time indexing and associated search/queries while reducing the leveraging of expensive and dedicated memory and processing resources. The aspects presented herein provide for improved access to data in combination with reduced complexity or cost for memory and processing resources.

Example techniques provide the efficient scaling of real-time indexing, for example, of big data. For example, disclosed techniques may lower the cost associated with real-time indexing. Additionally, disclosed techniques may provide scale and performance at big data scale using a non-complex implementation. Furthermore, the real-time indexing scheme disclosed herein is scalable so that latency of data availability is in the range of second to sub-second response times, rather than minutes and hours.

As mentioned above, real-time indexing allows data to be made available for analysis in a reduced amount of time, e.g., as quickly as possible. Whereas caching information improves query response times for previously requested information, the systems disclosed herein make new data available and committed in real-time (e.g., in less than a threshold interval). Thus, new data may be analyzed in a sub-second time range, which improves query performance.

According to one aspect of the present disclosure, a method for indexing in object storage is provided. The example method includes generating, at an object storage system, a first plurality of source data objects based on source files received at the object storage system, the source files having data, wherein the object storage system comprises an index based on a second plurality of source data objects in the object storage system, the index comprising a manifest file, at least one symbol file, and at least one locality file. The example method also includes generating one or more real-time manifest files based on the first plurality of source data objects, wherein each of the one or more real-time manifest files is associated with a segment of a workload being processed by a respective memory worker, the workload being based on the first plurality of source data objects. Additionally, the example method includes updating the index to include the one or more real-time manifest files. The example method also includes receiving a search query for at least one of the first plurality of source data objects and the second plurality of source data objects stored at the object storage system. Additionally, the example method includes generating a materialized view of a result set of the search query based on querying the index based on the search query, the manifest file, and the one or more real-time manifest files.

In another example aspect, a computer apparatus for indexing in object storage is provided. The example computer apparatus includes memory and at least one processor coupled to the memory. The memory and at least one processor are configured to generate, at an object storage system, a first plurality of source data objects based on source files received at the object storage system, the source files having data, wherein the object storage system comprises an index based on a second plurality of source data objects in the object storage system, the index comprising a manifest file, at least one symbol file, and at least one locality file. The memory and the at least one processor are further configured to generate one or more real-time manifest files based on the first plurality of source data objects, wherein each of the one or more real-time manifest files is associated with a segment of a workload being processed by a respective memory worker, the workload being based on the first plurality of source data objects. Additionally, the memory and the at least one processor are configured to update the index to include the one or more real-time manifest files. The memory and the at least one processor are also configured to receive a search query for at least one of the first plurality of source data objects and the second plurality of source data objects stored at the object storage system. Additionally, the memory and the at least one processor are configured to generate a materialized view of a result set of the search query based on querying the index based on the search query, the manifest file, and the one or more real-time manifest files.

According to another example aspect, a computer-readable medium is provided comprising instructions that comprises computer executable instructions for performing any of the methods disclosed herein. The computer-readable medium may be a non-transitory, computer-readable storage medium, for example.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for processing and analyzing data stored in object storage. For example, example aspects describe real-time indexing of the data stored in the object storage to improve query performance of the object storage. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
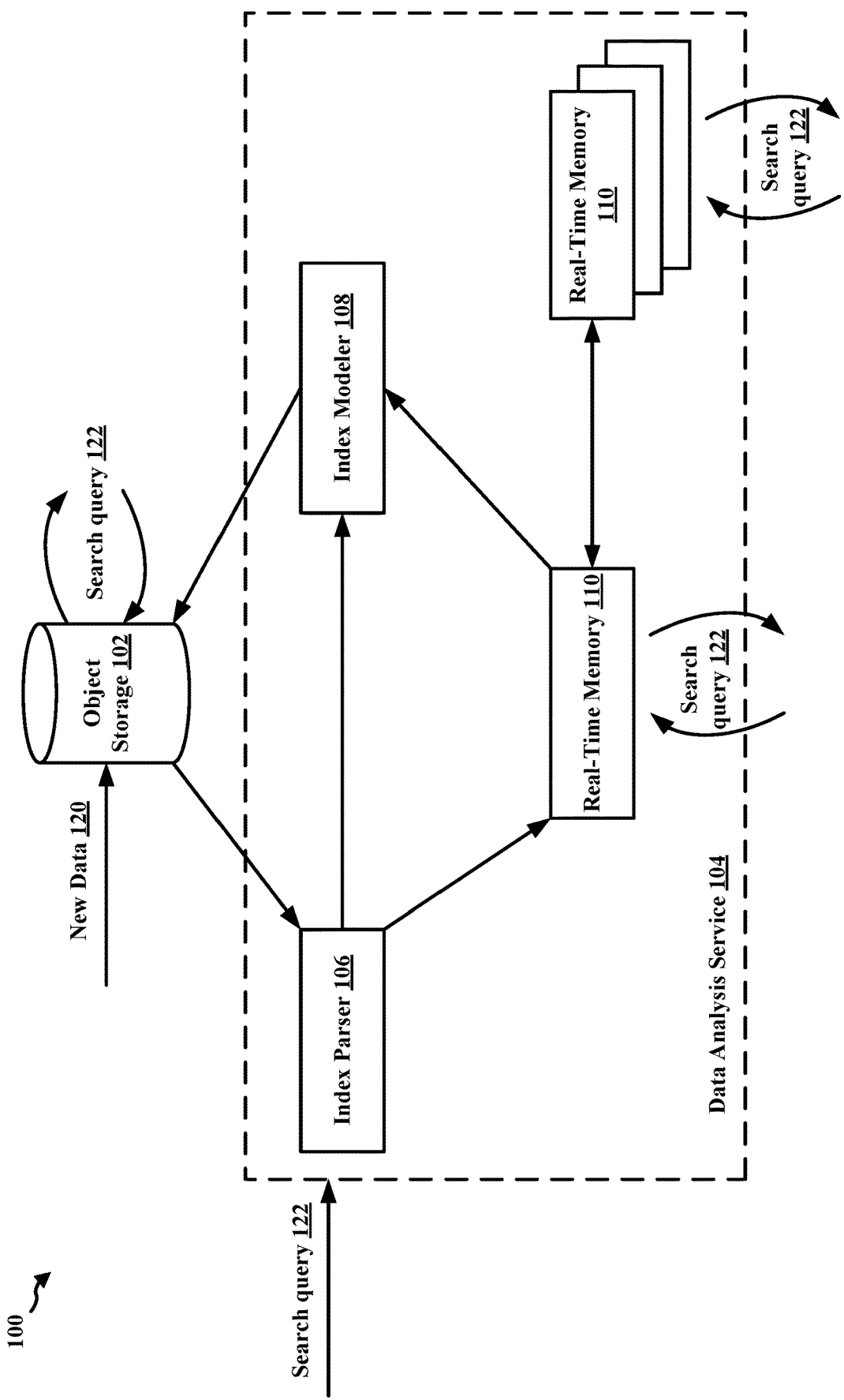
FIG. 1 is a communication flow illustrating a system for real-time indexing of data, in accordance with various aspects of the present disclosure.

FIG. 1 is a communication flow illustrating a real-time indexing system 100 for real-time indexing of data, in accordance with various aspects of the present disclosure. The example real-time indexing system 100 includes an object storage system 102 and a data analysis service 104.

As shown in FIG. 1, the object storage system 102 may ingest new data 120. Aspects of the object storage system 102 may be implemented by AWS S3™. The data analysis service 104 may register with the object storage system 102 to receive notifications when the new data 120 is stored at the object storage system 102. Thus, the real-time indexing system 100 disclosed herein may utilize the object storage system 102 to store ingested data and to notify the data analysis service 104 when the new data 120 is stored. An index parser 106 and an index modeler 108 of the data analysis service 104 may facilitate indexing the new data 120 via performing one or more of a data parse, a data modeling, and a data persist of the new data 120.

The indexing provided herein (e.g., via the index parser 106 and the index modeler 108) provides an ability to discover and organize data generically and concurrently, an ability to organize and represent data consistently and uniformly, an ability to compress and catalogue data to theoretical minimums, and an ability to query and analyze data without performing Extract, Transform, Load (ETL) processes. The disclosed indexing comprises a storage format where any processing algorithm can be applied to create, organize, and retrieve information.

In some aspects, the indexing provided herein (e.g., via the index parser 106 and the index modeler 108) may involve separating the symbols of a file from the symbols' location within the file. The indexing may be referred to as "indexing based on a symbol file and a locality file" or "indexing based on a separation of information about symbols and locality." Compression technology may then use the symbol and location of the symbol as part of its algorithm and representation. Among others, symbols within a file may be, for example, words, images, numbers, data, and time types, etc. For example, a document may comprise words (e.g., symbols) placed at particular locations (e.g., "locality") in a source file to be reconstituted in a lossless approach. By separating the symbols and locations of the symbols, data may be organized and compressed to its optimal state. In contrast, mixing the symbols and the locations of the symbols limits what any given compression algorithm can achieve. Symbols and locality of the symbols are not "like" entities and, thus, cannot be reduced easily. The index format also includes a descriptive "manifest" incorporated into the indexed data source that is used to map together interrelated symbol and locality segments, as well as provide descriptive indicators of how the underlying data is transformed or normalized into an index. Once data is indexed, the disclosed techniques provide the ability to quickly and easily assemble (or resolve) search queries in a dynamic manner and at scale to increase performance of database results.

Example techniques may leverage, include, or be based on a data format for universally representing any data source, with potential irregularities, e.g., data ranging from text-based files such as Text, JSON, and CSV, to image files such as PNG and JPG, and/or video files such as MPEG, AVI etc., so that the data can be virtually transformed and aggregated without considerable computation, while still providing built-in support for both relational queries and text searches. The data format can be manipulated without algorithmic execution and retrieve results at the speed of classic analytic solutions. The data format not only does not increase the actual storage footprint, but may actually decrease it. The data format may be configured to intrinsically describe itself such that it can be exported into other data formats without unnecessary conversion. Aspects of the data format may be referred to herein as "data edge," as "data edging," as "indexing based on a symbol file and a locality file," or as "indexing based on a separation of information about symbols and locality," etc.

To improve the latency of availability of the new data 120, the index parser 106 of the data analysis service 104 parses the new data 120 and caches the new data 120 in real-time memory 110, which makes the new data 120 available for analysis in real-time. Parsing the new data 120 makes the new data searchable in real-time.

Additionally, to reduce cost and to conserve processing resources, the example index parser 106 may reserve units of real-time memory 110 based on the data volume of the new data 120. For example, based on the notification of new data and/or the new data 120, the index parser 106 may determine a quantity of real-time memory 110 (referred to herein as "real-time memory workers") to reserve. Thus, the quantity of real-time memory 110 used to make the new data 120 available in real-time may adapt based on the data volume of the new data 120. Each unit of the real-time memory 110 may store a portion of the new data 120. Each unit of the real-time memory 110 may also provide processing services that enable the portion of the new data 120 stored at a respective unit of real-time memory 110 to be searched or queried.

For example, the data analysis service 104 may receive a search query 122 and parse the object storage system 102 for previously indexed data. The example data analysis service 104 may also (e.g., in parallel) parse the new data 120 stored in the one or more units of real-time memory 110 based on the search query 122. As such, the real-time memory facilitates making the new data 120 available in real-time for analysis, along with the previously indexed data (e.g., the data stored in the object storage system 102).

In some aspects, after a portion of the new data 120 is indexed by the index parser 106 and the index modeler 108 and stored in the object storage system 102, the index parser 106 may release a unit of the real-time memory 110 storing the respective portion of the new data 120. For example, a first unit of the real-time memory 110 may store a first data portion of the new data 120. After the first data portion of the new data 120 is indexed and stored in the object storage system 102, the index parser 106 may release the resources (e.g., the memory and processing resources) of the first unit of the real-time memory 110.

In some aspects, when the search query 122 returns a result (e.g., a hit), the disclosed techniques provide the ability to quickly and easily assemble (or resolve) search queries in a dynamic manner and at scale. Moreover, the data analysis service 104 may leverage the framework of the indexed data format to partially or fully "match" queries to past query results. For example, when the data analysis service 104 resolves the search query 122, the data analysis service 104 may store information related to the search query 122, such as what aspects of the object storage system 102 were searched, where the results of the search query 122 were located, etc., in the object storage system 102. Additionally, when the data analysis service 104 resolves the search query 122 based on the new data 120 in the one or more units of the real-time memory 110, the data analysis service 104 may store information indicating the portion of the new data 120 in the respective unit of the real-time memory 110. When the data analysis service 104 receives a subsequent search query, the data analysis service 104 may compare aspects of the subsequent search query with the information stored about the search query 122 to determine whether the data analysis service 104 is able to fully or partially resolve (e.g., answer) the subsequent search query based on the information stored about the search query 122.

Figure 2:
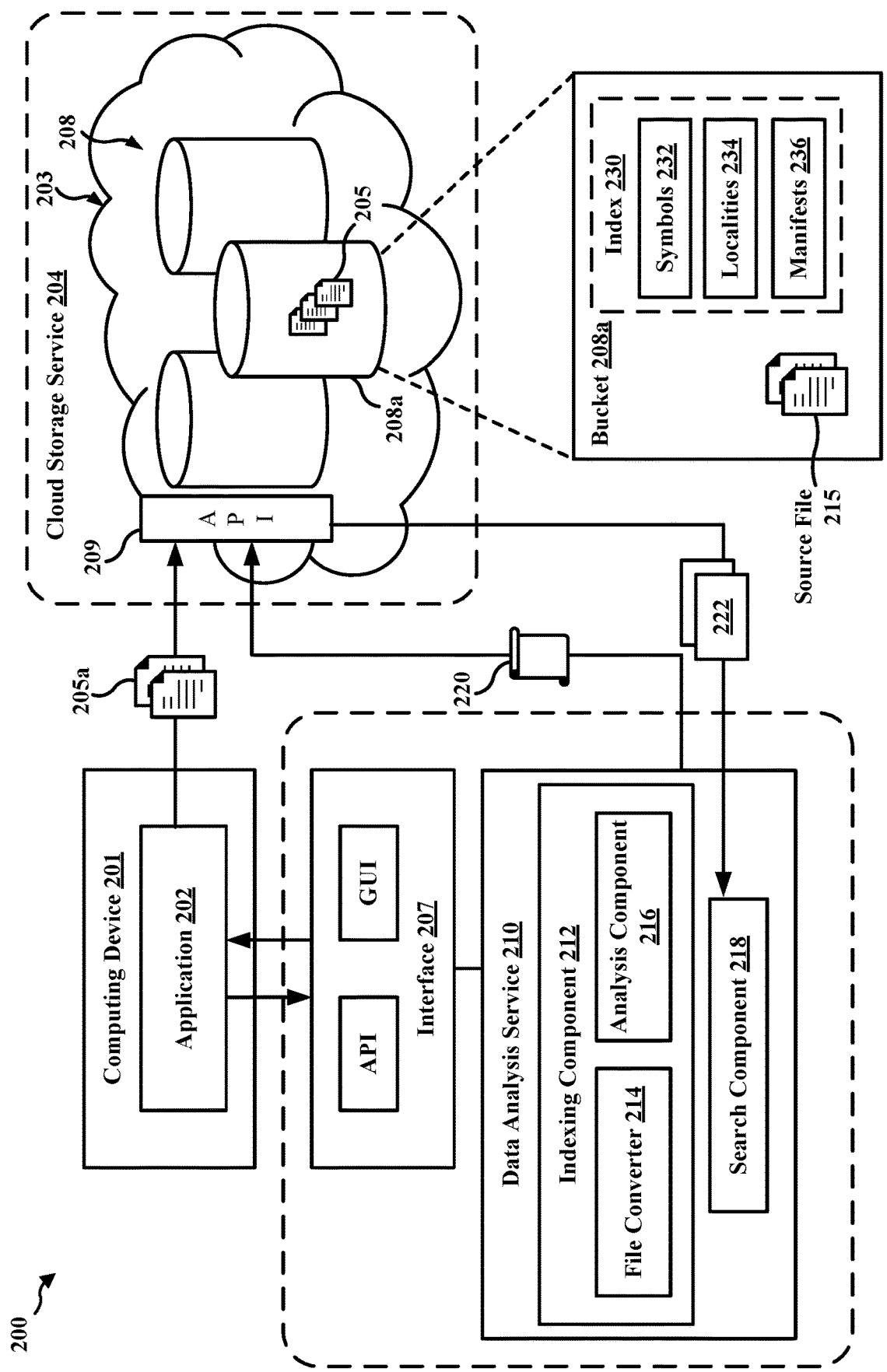
FIG. 2 is a block diagram illustrating a system for indexing and searching data stored in object storage, in accordance with various aspects of the present disclosure.

FIG. 2 is a block diagram illustrating a system 200 for processing and analyzing data stored in object storage, as presented herein. The system 200 includes a computing device 201 executing an application 202 that is configured to store data 205a in an object storage system 203. In the illustrated example, the object storage system 203 may be provided by a cloud storage service 204. In some examples, the application 202 may have a multi-tier software architecture in which user data of the application 202 is stored in a data layer in the object storage system 203. The application 202 may be configured to store, retrieve, modify, and/or access data in the object storage system 203 via an application programming interface (e.g., API 209), REST-based interface (e.g., using PUT, GET, LIST operations), or other interfaces exposed by the cloud storage service 204.

The object storage system 203 (sometimes referred to as "object-based storage") may include one or more storage devices configured to provide a data storage architecture that manages data 205 as objects, in contrast to a file system-based storage architecture (which manages data in a file hierarchy) or a block-based storage architecture (which manages data as blocks within sectors and tracks of physical media). Examples of object storage include object-based storage provided by such cloud storage services as AWS Simple Storage Service (S3)™ made available by Amazon, Microsoft Azure Storage™, or Google Cloud Storage™. While discussed in the context of public cloud services, it is understood that aspects of the present disclosure may also be applied to "on premise" or private object-based storage systems.

The object storage system 203 is configured to store units of data 205 as "objects" (also referred to as "blobs" in some architectures), and to map each object to a unique identifier (e.g., key, index, object name). For clarity of explanation, the data 205 stored in the object storage system 203 is interchangeably referred to as "files" in the present disclosure. The object storage system 203 may have a flat hierarchy and include a plurality of buckets 208, which may be logical containers for holding the data 205. That is, each object may be stored in a respective bucket of the plurality of buckets 208.

The data stored in the object storage system 203 may represent one or more computer files having a variety of file formats and types of data, including text data, binary data, log files, program data files, CSV (comma-separated values) files, XML files, JSON (JavaScript Object Notation) files, image files, audio files, and video files. The data 205 in the object storage system 203 may be characterized as structured data, unstructured data, or semi-structured data. A structured data file includes data arranged and organized according to a formal data model, such as the row-and-column structure of relational databases or data tables (e.g., CSV files). While not conforming to some formal structure of data model, a semi-structured data file may include data that is organized or annotated according to some pre-defined manner, for example, data that contains tags, markers, and other syntax that separate semantic elements and assign attributes and a hierarchy to the data (e.g., XML, JSON files). An unstructured data file refers to data that lacks a pre-defined data model and is not organized in a pre-defined manner, such as data found in text-heavy files.

Typically, the application 202 may store an amorphous mix (structured data, semi-structured data, and/or unstructured data) of bulk data in the object storage system 203, resulting in data being stored in a disjointed, disparate, and scheme-less manner. In some examples, the buckets 208 might expose structure by virtue of keys and their associated object or blob. As such, from the point of view of a user, the objects stored in the object storage system 203 may conform to some unspecified structure that is unknown, unless the user downloads and manually inspects the objects.

According to aspects of the present disclosure, the system 200 includes a data analysis service 210 configured to process and analyze the data 205 stored in the object storage system 203. In some examples, the data analysis service 210 may be configured to process files already stored in the object storage system 203, for example, all files contained in a selected bucket 208a. In some examples, the application 202 may store data 205 in the object storage system 203 using the data analysis service 210 as an intermediary, which in turn converts the data 205 into files stored in object storage.

In some examples, the data analysis service 210 may be a distributed server application executing on one or more computing devices. The data analysis service 210 may include an interface 207 that enables the application 202 to discover, refine, and/or query the data 205 that the application 202 has stored within its plurality of buckets 208 in the object storage system 203. In some examples, the interface 207 may be an API of the data analysis service 210 configured to provide the application 202 programmatic access to the functionality of the data analysis service 210 in relation to the data 205. In some examples, the API of the data analysis service 210 may be configured to extend or override (i.e., "wrap") the API interface provided by the cloud storage service 204. In some examples, the interface 207 of the data analysis service 210 may be a command-line interface (CLI) or a graphical user interface (GUI) of a server-based application that enables a user to interactively discover, refine, and/or query the data 205 stored within object storage.

In the illustrated example of FIG. 2, the data analysis service 210 includes an indexing component 212 configured to generate at least one index based on one or more data sources (e.g., the data 205). As shown in FIG. 2, the indexing component 212 includes a file converter 214 and an analysis component 216. The file converter 214 may be configured to convert data in object storage to a specialized file format. The converted file format disclosed herein is based on a symbol file and a locality file that enables the data analysis service 210 to discover, refine, and query object storage data in a more efficient manner. The converted file format allows improved compression of the data stored in object storage based on the separation of symbols from their location. The converted file format models data sources in an edge space representation that can be analyzed via complex mathematical algorithms, such as linear algebra computation.

The file converter 214 and/or the data analysis service 210 may process data 205 in object storage in a manner that separates the symbols of a file from their location in the file. In one aspect, the file converter 214 may be configured to, given a source file 215 of data, generate a converted file 220 organized into: (1) a symbols portion 232 (sometimes referred to as a "symbol file") containing the symbols of the source file 215, and (2) a localities portion 234 (sometimes referred to as a "locality file") containing values representing the respective locations of those symbols in the source file 215. In some aspects, the data analysis service 210 may create two files from the source file 215: a symbols file (e.g., "filename.I2S", containing the symbols portion 232) and a locality file (e.g., "filename.L2I", containing the localities portion 234). In some examples, the symbol file and the locality file may be concatenated into one file (e.g., after it is compressed), and in other cases, the symbol file and the locality file may be maintained separately.

In some aspects, the converted file 220 may further include a metadata portion (e.g., "filename.MDS") that contains metrics, statistics, and other metadata related to the original data source (e.g., the data 205), to the converted file 220, and to the conversion process performed. For example, the indexing component 212 of FIG. 2 includes the analysis component 216 configured to analyze one or more converted file(s) and generate statistical information (e.g., a manifest portion 236) based on the data contained in the one or more converted files. The analysis component 216 may be configured to perform "in-place" normalization, aggregation, and correlation in which the statistics and manipulation of the data source is within the storage layer itself (e.g., object storage). In some examples, the analysis component 216 may be configured to perform relevant cleansing and preparation functionality by manipulating locality file(s) of converted files in object storage. This is performed with less memory, at larger scale, and with greater speed than existing tooling, which may use separate data warehousing to perform ETL and analysis.

Data compression techniques generally involve encoding some data using fewer bits than the original representation by finding patterns and eliminating redundancy. Consider the simple example of a data source file containing one hundred symbols, in which all symbols are the word "cat." A compressed version of this example data source file may encode this file as "100cat" to eliminate the redundant instances of the symbol "cat," resulting in a data reduction of 300 units of information to 6 units. Data compression algorithms attempt to find common symbols within symbols, as well as sequences represented in a form smaller than its original representation. In another example, a sequence of numbers from one to a million could be represented as "1ToMillion," with a saving factor of 6 times. It has been determined that as the source file gets larger, it becomes more difficult for a compression algorithm to find common or redundant patterns. Accordingly, the format of the converted file is configured to organize symbols in a manner that facilitates more efficient data compression.

Figure 3:
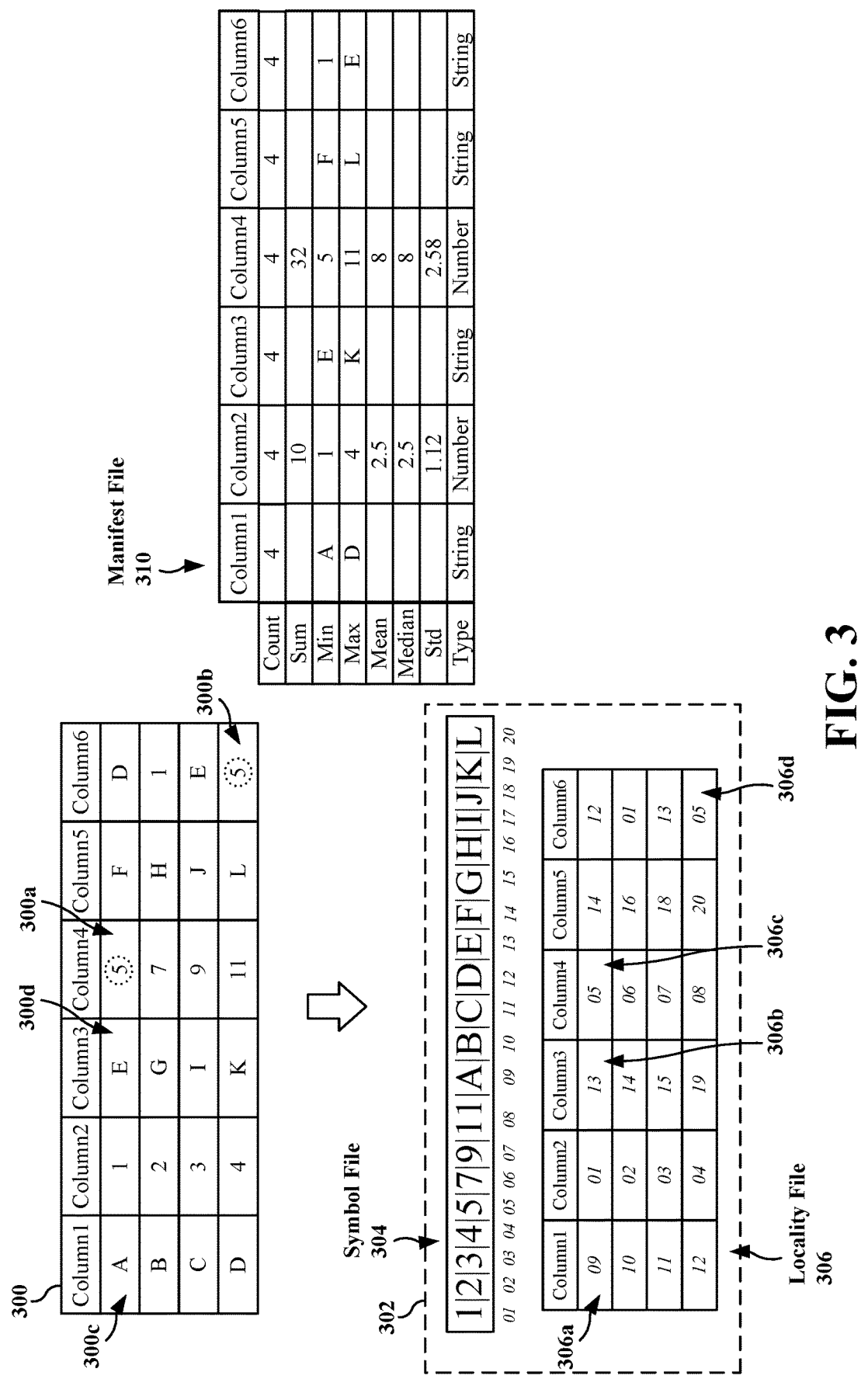
FIG. 3 is a block diagram depicting a structured data source file and a corresponding converted index file, in accordance with various aspects of the present disclosure.

FIG. 3 is a block diagram depicting a structured data source file 300 and a converted file 302 corresponding to the structured data source file 300, in accordance with aspects presented herein. The structured data source file 300 contains structured data having a plurality of records organized into rows and columns. For example, the structured data source file 300 contains values having symbols (e.g., "A," "1," "E," "5," "F," "D," etc.) arranged in a 4-row by 6-column table format (the row containing column headers "Column1", "Column2", etc. is omitted from this discussion). The structured data source file 300 is rendered in FIG. 3 in a table format for the sake of illustration, but it is understood that the structured data may be encoded in a variety of formats. For example, the structured data source file 300 may be a delimiter-separated file (such as a CSV file) containing a plurality of records (e.g., lines), where each record comprises fields separated by a delimiter (e.g., a comma). In another example, the structured data source file 300 may be a log file containing a plurality of log entries, for example, separated by a tab or whitespace character.

The file converter 214 of FIG. 2 may create a symbol file 304 associated with the structured data source file that contains each unique symbol found in the structured data source file 300. In some examples, the file converter 214 may perform an initial reduction of the structured data source file 300. For example, the file converter 214 may find and remove duplications and/or may find and order sequences. In some examples, the file converter 214 may scan through the structured data source file 300, identifying each unique symbol contained in the structured data source file 300, order each identified unique symbol, and disregard any duplicate symbols. For example, the file converter 214 may identify that the structured data source file 300 contains a duplicate symbol "5" at a first entry 300*a* (e.g., at the first row, fourth column), as well as at a second entry 300*b* (e.g., at the fourth row, sixth column). In the illustrated example of FIG. 3, the duplicate symbol "5" is indicated by dashed circles. In some such examples, the file converter 214 may include a single instance of the symbol "5" in the symbol file 304.

In some examples, the file converter 214 may represent symbols as "Strings" type. In some examples, the file converter 214 may determine that it may be more efficient to convert one or more symbols from the structured data source file 300 into a different data type, such as a number or a timestamp (e.g., date and/or time information). In some examples, the different example data types of strings, number, timestamps, etc., may allow the data analysis service 210 to order symbols with greater efficiency. It may be appreciated that ordering the numbers as strings can produce a different result than using the actual number under alphanumeric ordering. For example, the numerical symbols shown in the symbol file 304 are sorted as numbers (1, 2, 3, . . . , 9, 11), rather than as strings, which would produce (1, 11, 2, 3 . . . ).

Additionally, it may be appreciated that by storing the symbols as strings, the symbols correspond to lossless representation of the original data. For example, a timestamp may be generated in a first format (e.g., YYYY MMM DD at HH:MM:SS am/pm), but the timestamp may be saved in a second format. By storing the timestamp as a symbol of data type string, all of the information of the generated timestamp may be retained. In contrast, by storing the timestamp as a different data type (e.g., such as a number of milliseconds after an epoch), some of the original information of the first format may be lost.

In some examples, once the symbols have been reduced and organized, the symbols may be concatenated with a delimiter. In the illustrated example of FIG. 3, the symbols in the symbol file 304 are separated by a vertical bar or pipe character "|". It may be appreciated that using the symbol delimiter to separate symbols may facilitate reducing the amount of information used to represent the symbols. For example, representing a symbol using Type, Length, Value (TLV) encoding may include one or more bytes to represent the data type of the symbol, one or more bytes to represent the length of the symbol, and N bytes to represent the actual symbol (e.g., two or more "extra" bytes to represent the actual symbol). In contrast, by representing a symbol as a string, the symbol may be represented using N bytes to represent the actual symbol and one extra byte to represent the delimiter symbol. The symbol delimiter may be unique in the context of the symbols, and may also be reduced during the compression operation. In some examples, each symbol in the symbol file 304 as well as localities in a locality file 306 of the converted file 302 may be represented in binary format (e.g., as a "0" or a "1") for improved compression.

The file converter 214 may generate the locality file 306 containing each location of each symbol. The locality file 306 represents the structure of the modeled source (e.g., raw data source). As used herein, the term "position" refers to a locality within the source file (and the mirrored localities in the locality file), which is distinguished from the term "location," which refers to a locality or coordinates within the symbol file. If a symbol is in the structured data source file 300 more than once, a new value (representing a symbol location) is added. As shown in FIG. 3, each symbol in the symbol file 304 has a corresponding location (within the symbol file). For example, the symbol "1" is located at location "01," the symbol "A" is located at location "09," and the symbol "L" is located at location "20" of the symbol file 304. The position (e.g., within the locality file 306) of a location value is a mirror of the structured data source file 300. In other words, the locality file 306 may be similar to the structured data source file 300 except that in place of the actual symbol, the locality file 306 includes a value representing the location of a particular symbol within the symbol file 304.

For example, at a first entry 306a of the locality file 306 (e.g., at the first row, first column), the locality file 306 comprises a location value "09" in place of the symbol "A" found in a corresponding position 300c in the structured data source file 300. In another example, at a second entry 306b of the locality file 306 (e.g., at the first row, third column), the locality file 306 comprises a location value "13" in place of the "E" symbol found in a corresponding position 300d in the structured data source file 300. In yet another example, the locality file 306 contains two instances of the location value "05" (e.g., at a third entry 306c and a fourth entry 306d) to represent the two separate occurrences of the symbol "5" in the structured data source file 300 (e.g., at the first entry 300a and the second entry 300b).

In some examples, a location value may be implemented as an integer value that is a simple index or offset relative to the symbol file 304. For example, a location value "01" represents a first-ordered position in the symbol file 304. In other examples, a location value may be coordinate values (e.g., x-y) of a symbol within structured data. In yet other examples, a location value may be an address of a symbol contained within the symbol file 304. In some examples, the location values may be fixed in size (e.g., expanded by adding prefix 0's), and/or represented in binary (e.g., as 0s and 1s). In some examples, using a fixed size for the location values may allow for a more efficient processing protocol because fixed size fields may have a reduced overhead. In other words, simplified math may be used to find a given symbol in a data source file.

In some examples, the analysis component 216 of FIG. 2 may generate a manifest file 310 that contains statistics about the structured data source file 300. For example, the analysis component 216 may generate, for each column of data, statistics such as cardinality (count), a sum value, a minimum value, a maximum value, an average (mean), a median value, and a standard deviation ("Std"). For example, the analysis component 216 may generate statistics for column 2 of the structured data source file 300 indicating a count of four records (rows) having data in that column, a sum total of 20, a minimum value of 1, a maximum value of 4, an average value of 2.5, a median value of 2.5, and a standard deviation of 1.12. It may be appreciated that the analysis component 216 may generate different statistics based on the type of data in a column. Statistics for columns containing string or text data may include text-search-related statistics, such as distance, correlation, and/or association. Although not shown in FIG. 3, in some examples, the manifest file 310 may additionally or alternatively include information (e.g., metadata) regarding the converted file 302 and/or to the conversion process performed with respect to the structured data source file 300 and the converted file 302.

According to an aspect, the converted file format comprising a symbol file and a locality file may be configured to support lossless compression. That is, the original source file (e.g., the structured data source file 300) can be recreated from the encoding in the converted file 302. For example, to reproduce the original data source, the locality file 306 can be scanned, each location value may be used as a lookup index in the symbol file 304, and the location value may be replaced with the retrieved symbol.

Aspects of the present disclosure may store and compress data in a more effective manner, such as closer to or at its theoretical minimum. For example, if a data source file is compressed using some standard compression tool, the resulting file may achieve the theoretical minimum associated with that particular algorithm. Unique to the example techniques disclosed herein is the ability to facilitate adaptive and/or intelligent organization of the derived locality file and symbol file such that the data source can be compressed "below" the theoretical minimum even when using the same compression algorithms. Additionally, in the data analytics world, additional information may be added to facilitate performing information retrieval. In some examples, this additional information overhead can be greater than the theoretical minimum the file could achieve and, at a larger data scale (e.g., a scale for big data), can be a tremendous cost. In some examples, the value of the incurred cost may be particularly large when cataloguing (e.g., indexing) is used to speed up ever increasing number of specific result set retrievals.

Figure 4:
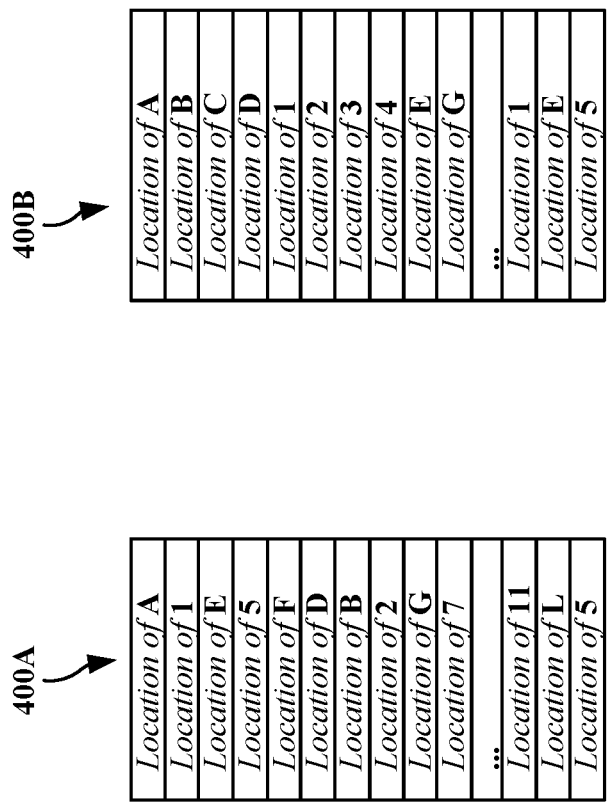
FIG. 4A depicts a representation of a locality file in a row-based orientation, in accordance with various aspects of the present disclosure.
FIG. 4B depicts a representation of a locality file in a column-based orientation, in accordance with various aspects of the present disclosure.

In some aspects, the compression algorithms may have some difficulty finding patterns when the distance of those patterns is large or disjointed. As a result, the localities in a locality file may be ordered by a row or column orientation, as shown in FIGS. 4A and 4B, respectively, or even by diagonal orientation. FIG. 4A depicts one representation of a locality file 400A in a row-based orientation. For example, the locations of symbols in the first row of the structured data source file 300 are listed sequentially, followed by the locations of symbols in the second row of the structured data source file 300, and so forth. FIG. 4B depicts a representation of a locality file 400B in a column-based orientation. For example, the locations of symbols in the first column of the structured data source file 300 are listed sequentially, followed by the locations of symbols in the second column of the structured data source file 300, and so forth. In the illustrated example of FIGS. 4A and 4B, the location value is represented in generic terms such as "Location of A," for clarity of illustration.

Although the example of FIG. 3 provides examples of converting a structured data source file into an index file, in other examples, the disclosed techniques may be applied to other data types. For example, the disclosed techniques may be applied to unstructured data, such as text data. In some examples, the disclosed techniques may be applied to structured data with text values. In some examples, the disclosed techniques may be applied to semi-structured data, such as a JSON files and XML, files.

Figure 5:
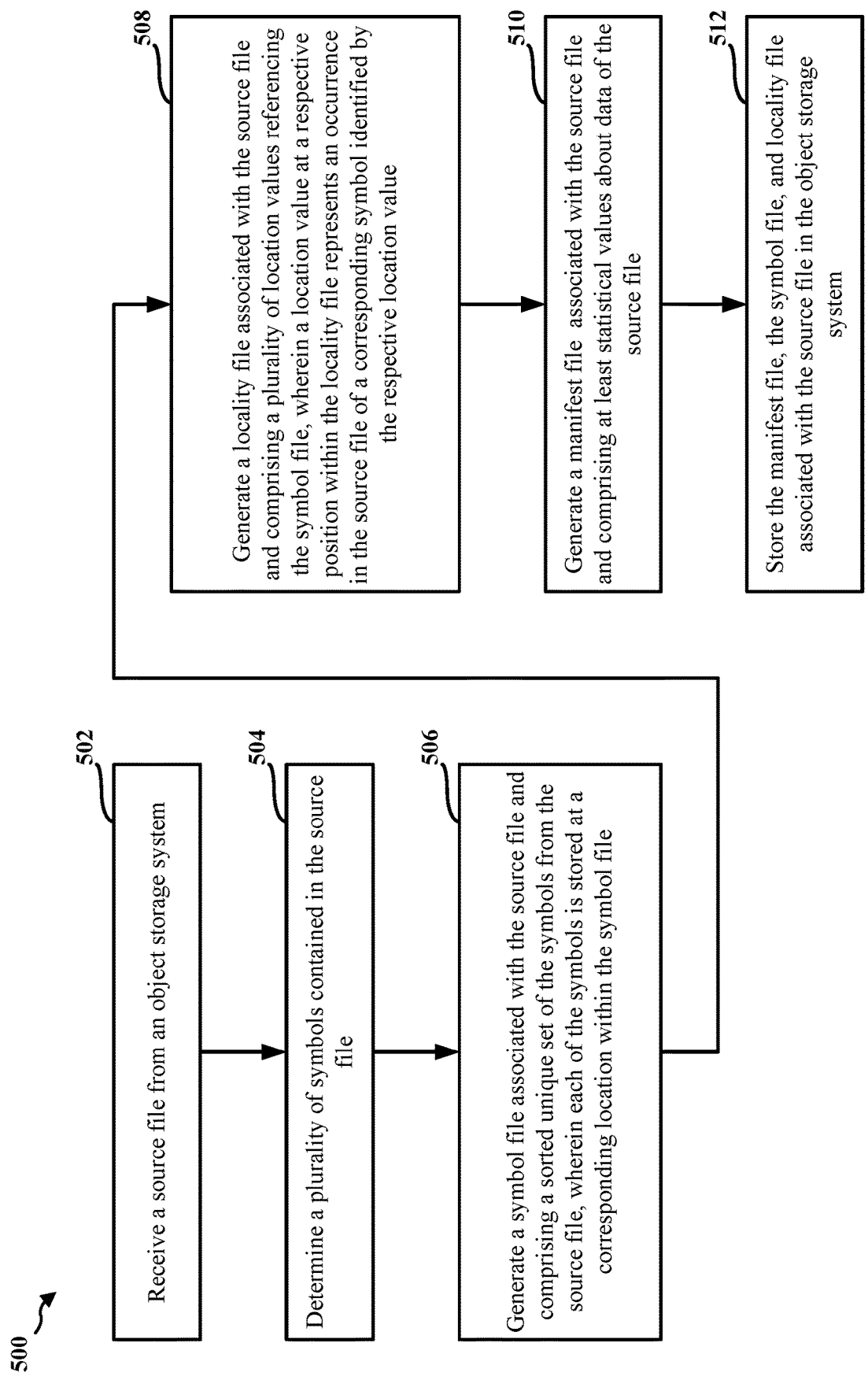
FIG. 5 is a flowchart illustrating a method for processing and storing a file in object storage, in accordance with various aspects of the present disclosure.

FIG. 5 is a flowchart illustrating a method 500 for processing and storing a file in object storage, in accordance with aspects presented herein. The method 500 may be performed by the data analysis service 210, by the indexing component 212, by a component of the indexing component 212, such as the file converter 214 and/or the analysis component 216, or by the object storage system 203. It is noted that the following description of the example method 500 refers to the example system 200 and components described above in connection with FIG. 2 and FIG. 3. The method 500 for processing and storing a file in object storage enables improved compression rates of object data due to the separation of symbol and locality.

At step 502, the indexing component 212 (e.g., using the file converter 214) receives, from the object storage system 203, one or more source files, such as the example source file 215. In some examples, the receipt of the source files is triggered by user input that selects a bucket in which the source file is obtained. In some examples, a user may select the bucket for discovery and/or analysis. In some examples, the receipt of the source file is automatically triggered in response to detecting the creation of modification of the source file in object storage.

The file converter 214 may convert the source file 215 to the converted file format to facilitate later discovery, refinement, and query operations. For example, FIG. 3 illustrates an example of conversion of a structured data source file 300 having structured data, such as CSV files, into the symbol file 304 and the locality file 306 of the converted file 302.

At step 504, the indexing component 212 determines a plurality of symbols contained in the source file 215. For example, the file converter 214 may scan through the source file 215 to identify individual symbols contained in the source file 215. The file converter 214 may use predetermined character(s) as delimiters between symbols (e.g., such as whitespace).

At step 506, the indexing component 212 generates a symbol file associated with the source file 215 and comprising a sorted unique set of the symbols from the source file 215. For example, the file converter 214 may generate the symbol file 304 associated with the structured data source file 300. Each of the symbols may be stored at a corresponding location within the symbol file 304. In some examples, the sorted unique set of the symbols in the symbol file 304 are concatenated together with a delimiter.

At step 508, the indexing component 212 generates a locality file associated with the source file 215 and comprising a plurality of location values referencing the symbol file. For example, the file converter 214 may generate the locality file 306 associated with the structured data source file 300 and comprising a plurality of locations values referencing the symbol file 304. A location value at a respective position within the locality file 306 represents an occurrence in the structured data source file 300 of a corresponding symbol identified by the respective location value. In some examples, the source file 215 may comprise structured data, and the location values may be ordered within the locality file by one of a row orientation or a column orientation. For example, the source file 215 may comprise at least one of a comma-separated values (CSV) file having a plurality of records, each record comprising a plurality of fields separated by a delimiter character.

In some examples, the indexing component 212 may identify a type of data contained in the source file 215. For example, the file converter 214 may identity the type of data based on a file extension of the file, based on metadata associated with the file identifying the type of data, or based on an inspection of the file itself. Responsive to determining that the source file 215 comprises unstructured text data, the file converter 214 may generate a plurality of fingerprint values based on the determined plurality of symbols contained in the source file 215. The file converter 214 may then generate the locality file 306 comprising the plurality of fingerprint values. A fingerprint value based on a corresponding symbol and at a respective position within the locality file may represent an occurrence in the source file 215 (e.g., the structured data source file 300) of the corresponding symbol.

In another aspect, responsive to determining that the structured data source file 300 comprises semi-structured data, the file converter 214 may transform the semi-structured data into a two-dimensional structure prior to generating the locality file 306. For example, a source file comprising semi-structured data may be formatted as at least one of a JavaScript Object Notation (JSON) file and an extensible markup language (XML) file.

At step 510, the indexing component 212 generates a manifest file associated with the source file 215 and comprising at least statistical values about data of the source file 215. For example, the file converter 214 may generate the manifest file 310 associated with the structured data source file 300. For example, the analysis component 216 may generate, for each column of data, statistics such as cardinality (count), a sum value, a minimum value, a maximum value, an average (mean), a median value, and a standard deviation ("Std"). For example, the analysis component 216 may generate statistics for column 2 of the structured data source file 300 indicating a count of four records (rows) having data in that column, a sum total of 20, a minimum value of 1, a maximum value of 4, an average value of 2.5, a median value of 2.5, and a standard deviation of 1.12. It may be appreciated that the analysis component 216 may generate different statistics based on the type of data in a column. Statistics for columns containing string or text data may include text-search-related statistics, such as distance, correlation, and/or association.

At step 512, the indexing component 212 stores the manifest file, the symbol file and the locality file associated with the source file 215 in the object storage system 203. For example, the file converter 214 may store the manifest file 310, the symbol file 304 and the locality file 306 associated with the structured data source file 300 in the object storage system 203. In some aspects, the file converter 214 stores the manifest file, the symbol file, and the locality file in a same bucket as the source file 215 in the object storage system 203. In some aspects, the file converter 214 may generate the converted file 220 that comprises the manifest file and the symbol file concatenated with the locality file. In some aspects, the data analysis service 210 may facilitate searching the source file 215 by querying the locality file associated with the source file 215.

It may be appreciated that the example method 500 of FIG. 5 for processing and storing a file in object storage enables improved compression rates of object data due to the separation of symbol and locality. As described above, by separating the source file into a symbol file and a locality file, it may become more efficient to manage data in a data store (e.g., the object storage system 203). For example, data analysis, manipulation, and/or queries can be handled without decompressing the symbol file. Additionally, modifications may be made to the locality file to update the data in the source file.

Aspects of the present disclosure further provide techniques for materialization of data in object storage using the converted file format described herein. For example, disclosed techniques may index object storage where data is an object that can represent one or more entries (e.g., rows) and where these objects can be grouped together to make a dataset. The described techniques for data materialization provide an approach to manipulating indexed data, as well as resolving analytical text search and/or relational queries. That is, based on data indexing, the disclosed techniques provide the ability to quickly and easily transform and/or assemble answers for a request in a dynamic manner and at scale. The term "materialization" is used herein as the overarching name for both data virtualization and view materialization capabilities since all aspects of known extract, transform, and load (ETL) processes can be characterized as late materialization.

In an aspect, data materialization is the realization of a result set based on indexes, either fed by an initial representation and/or potential transformations to resolve a particular search request and/or query of data stored in object storage. A request can be a combination of predicates (e.g., database functions) referred to herein as a "query plan." In other words, a query plan can be a sequence of functions that take a dataset (e.g., an index) and sorts/reduces the dataset to a final (potentially smaller) result set.

Referring again to the example system 200 of FIG. 2, in some examples, the indexing component 212 may read the raw data from object storage, and create an index 230, which may then be stored back in object storage. In some examples, queries are processed based on the indexes and raw data may not be read to resolve any particular query request. In other cases, the indexing component 212 reads the raw data from another source (e.g., not object storage), and stores the resulting indexes in object storage. Although the example of FIG. 2 illustrates a single instance of the indexing component 212, it is understood that the operations of the described techniques are able to be performed by a distributed system in parallel. For example, the system 200 may execute multiple instances of the indexing component 212 to convert a large amount of data in the object storage system 203 to the described converted format.

The index 230 is an indexed form of the one or more data sources. In some aspects, the indexing component 212 may utilize the analysis component 216 for analyzing one or more data sources and generating statistical information (e.g., a manifest portion). In an aspect, the index 230 includes at least one manifest portions, one or more symbol portions, and one or more locality portions. The manifest portion 236 contains schema information, statistics, metrics, and other metadata related to the original data source(s), to the index, and to the indexing processing performed. The symbols portion 232 contains all the symbols found in a data source file (e.g., ordered internally). The localities portion 234 contains values representing the respective locations of those symbols in the original data sources (e.g., raw/refined source). As described in greater detail below, the combination of the manifest file, the symbol file, and the locality files may be used to optimize access to object storage, where each component file is used to resolve a materialization request with reduced time, size, and cost metrics (e.g., how long does it take to index a data source, of what size is the resulting index, and at what cost) compared to known techniques. As described later, during the indexing process, a root and branch type data structure can be generated to summarize multiple manifest files of a single index, such that several manifest files are combined or summarized into leaf nodes.

In one aspect, the manifest portion 236 may include statistics and metrics about the indexed data, which were compiled during the indexing process, and may be updated as a result of any refinement or transformation operations performed on the index. Such statistics provide enough information to either resolve a specific request and/or scope (e.g., reduce) object storage access, without accessing the underlying symbol files, locality files, or raw source data, or at least with reduced accesses compared to the known techniques. The statistics may include information about the type or format of the source file 215 (e.g., CSV, JSON, XML, log file, etc.), and information indicating the type(s) of data in the source file 215 (e.g., structured, semi-structured, unstructured, strings, numbers, text data). The statistics may further specify any structure(s) in the data sources. In an aspect, the statistics may specify, for each column of data in the underlying data source, a "minimum" and/or "maximum" symbols that are the symbols that would be first in sequence and last in sequence, respectively, if all the symbols in a data range (e.g., a particular column) were in a sorted order. In one aspect, the analysis component 216 may calculate statistical functions of the source data, such as the minimum, maximum, average, mean, cardinality, standard deviation, and count of a particular column in the data source. Based on statistics, the analysis component 216 may be configured to derive a scheme of a data source, such as a type of column (e.g., string, integer, time), or a name of a column if the data matches a particular format (e.g., time, email, URL).

The data analysis service 210 publishes the indexed data source(s) to support execution of analytics and search queries, such as text searches and relational queries. For example, the indexing component 212 may index the source data in the form of the index 230 to support the execution of text search and relational queries on that data, which is not conventionally available in object storage systems. In some examples, the index 230 may be defined, in part, by an internal schema and sort order (e.g., as specified in the manifest portion 236) thereby providing materialization features to the data stored in object storage. In some examples, the data analysis service 210 may publish the indexed data source(s) as a virtual bucket, which may be configured similar to the buckets 208.

In one aspect, the data analysis service 210 may provide a graphical user interface that displays the data sources stored in object storage and that provides an interface through which a user can analyze and run queries on the data sources. The graphical user interface of the data analysis service 210 may enable a user to access the data sources contained in the index 230, rather than be limited to displaying the content of each of the individual physical buckets of the plurality of buckets 208. After data source(s) have been indexed and published, the data analysis service 210 may use the indexes to display statistics related to the underlying data sources, as well as provide user interface elements for the submission of a search query to be executed on the data index.

In an aspect, the data analysis service 210 may create an initial data edge index (e.g., the index 230) of object data having a schema and sort order corresponding to the lossless state of the original raw sources (e.g., the data 205). In other words, the materialization of this index, which is akin to a relational database generalized selection (e.g., "SELECT *"), will reproduce the exact raw source state of the data 205.

In another aspect, each index may be refined using one more transformation operations, which can be seen as a new index that can be analyzed and/or used as another index to be refined again. For example, the index 230 may be transformed by a change in schema types (e.g., columns), a change in schema type names, a change in the order or shape of the schema, a change in the data set sort order by type, or an aggregation or correlation between two or more indexes. The transformed index may be implemented by a modification to the existing manifest or creation of a new manifest, while the linked-to symbol files and locality files remain unchanged. In an aspect, transformations may be considered as descriptions where each description can be applied in sequence to produce the desired data set. Each transformation operation may be executed on-demand. That is, a new manifest file that describes or specifies new transformations, aggregations, correlations, or sort orders, and any combination thereof can be executed on the symbol files and the locality files dynamically and in a desired sequence to produce a particular data set.

As shown in FIG. 2, the system 200 includes a search component 218 configured to receive one or more search queries for the data stored in one or more indexes. In some aspects, a search query 222 may be one of a relational query and a text search. The search component 218 is configured to execute the search queries on data using the index 230, including an analysis of the manifest portion 236, the symbols portion 232, and the localities portion 234. The unique arrangement and structure of the data structures in the index 230 advantageously enable the described system to quickly perform such operations on data stored in object storage compared to known techniques.

As an overview, the search component 218 may use the symbols portion 232 to determine if a word and/or phrase is present within the indexed data, and may use the localities portion 234 to determine the structure of the resulting dataset. Searching the symbols portion 232 may involve performing a binary search, unique scanning, and/or other suitable search algorithms. As discussed below, the symbols portion 232 contain a number of times (e.g., hits) a symbol exists in the localities portion 234. If no wildcards are contained in the search query 222, the search component 218 may perform a binary search to find/search for the existence of the specified symbol in the symbols portion 232. If wildcards are contained in the search query 222, the search component 218 may perform a binary search to process a prefix portion of the search query 222 (e.g., the search term up to the wildcard), and may then perform unique scanning to handle the remainder of the search term. Prefix wildcarding includes unique/optimized scanning that the performed scanning may be unique because it is a stream-based or bit-based search without restart, and because it hits a threshold of collections. Thresholds may be applied to stop location collection and to proceed to the localities portion 234 to continue the scan.

In an aspect, the search component 218 is configured to execute one or more search queries for the analysis of data in the index 230, including text search and relational queries. Each of these aspects can be used to feed the other as part of a query plan. For example, the search component 218 may use a text search operation to first filter a large dataset into entries that can be analyzed via relational functions. In an aspect, the search component 218 may execute a text search having a term matching clause, a wildcard matching clause, and/or one or more Boolean operators on a virtual bucket of data stored in object storage using the manifest portion 236 and/or the symbols portion 232 of the index 230. For example, the search component 218 may execute a text search that includes a term matching clause specifying a text term (e.g., a string literal, text value) and returns a result set from data stored in object storage that matches the specified text term. As used herein, the data stored in object storage includes converted files (e.g., the example converted file 220) stored in object storage and that represent the actual raw data in object storage. In another example, the search component 218 may execute a text search that includes a wildcard matching clause that specifies a search expression having a wildcard and returns a result set from data stored in object storage that satisfies the search expression. In another aspect, the search component 218 may execute a relational query on data stored in object storage using the manifest portion 236, symbols portion 232, and localities portion 234 of the index 230. Example relational functions of a relational query that the search component 218 may execute include a SELECT, DISTINCT, ORDER BY, GROUP BY, RANGE BY, FIND UNTIL, and INNER JOIN operation as well as text search functions such as match, match_phrase (e.g., for matching exact phrases or word proximity matches), multi_match (e.g., for multi-field queries), range (e.g., for matching documents with fields that have terms within a particular range), text search include/exclude operations, and wildcard (*) operators. Each relational function can be combined with any other function to create a query plan to resolve both text search and/or relational query, or any combination thereof.

In one aspect, the search component 218 may be configured to drive access through a workflow that includes a sequence of manifest file, then symbol file, then locality file of an index. Such an approach improves the functioning of existing search and analysis systems by decreasing or limiting the amount of object storage access requests that are employed to resolve a materialization. The search component 218 may use the manifest portion 236 to first scope the symbol portions, which are then used to scope the locality portions. That is, the manifest portion 236 may be used to determine where the data is, which then allows the search component 218 to efficiently fetch the symbols portion 232 and/or the localities portion 234 that can answer a request. In some examples, parsing the manifest portion 236 may enable the search component 218 to answer particular requests (using the metadata and statistics contained in the manifest portion 236) without retrieving or accessing the symbols portions and/or the localities portions. In other cases, the search component 218 may first access the manifest portion 236 and then access the localities portion 234 (e.g., without accessing the symbols portions), for example, in situations in which particular symbol materialization is not needed. That is, in cases in which symbol files are used (e.g., only needed) to materialize the result set (e.g., locality to symbol mappings), the accessing of the symbols portions can be skipped.

Figure 6:
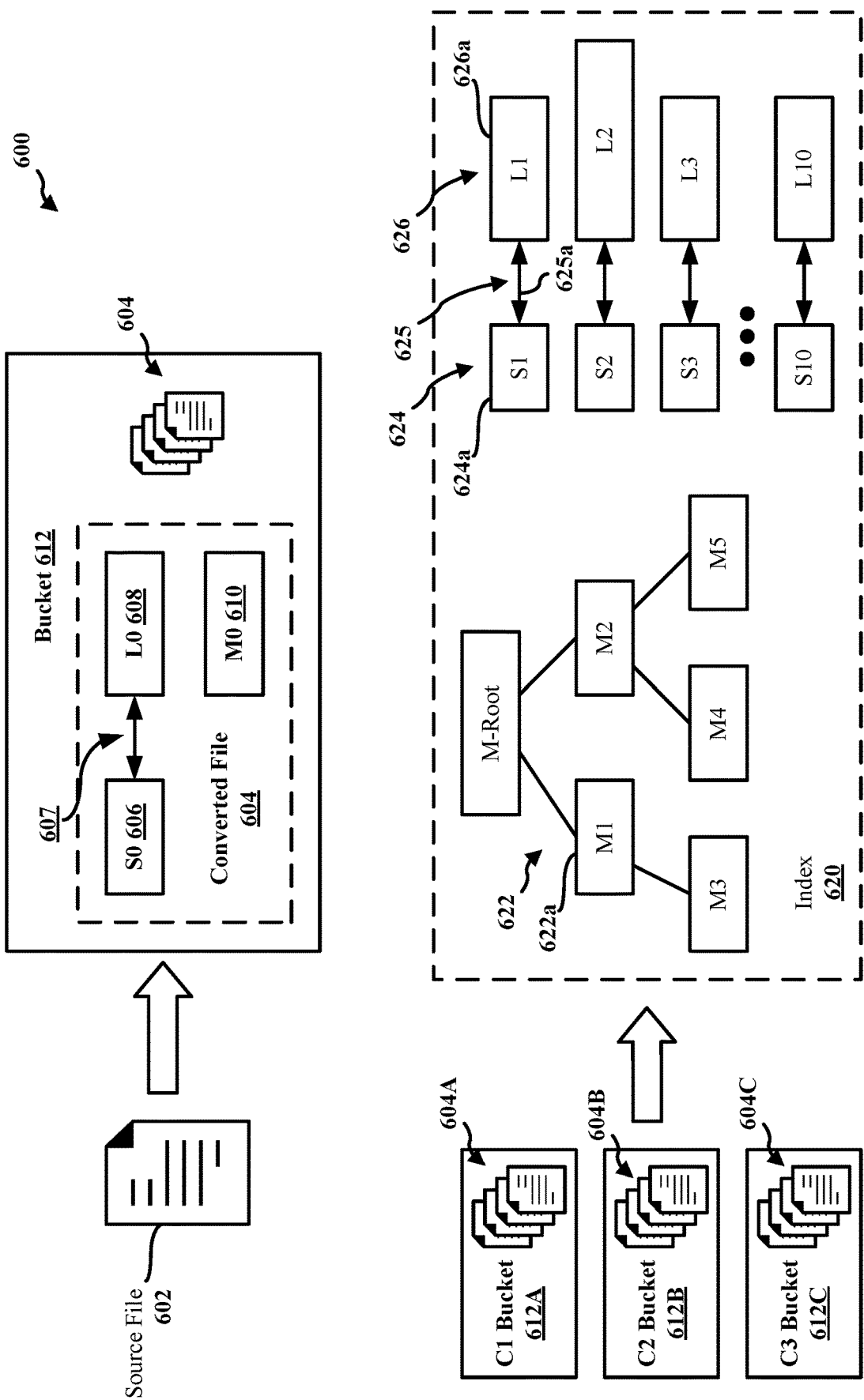
FIG. 6 is a block diagram depicting the indexing of data stored in object storage, in accordance with various aspects of the present disclosure.

FIG. 6 is a block diagram 600 depicting the indexing of data stored in object storage, as presented herein. Aspects of the block diagram 600 may be described in connection with the example system 200 of FIG. 2. In the example shown in FIG. 6, the data analysis service 210 may convert a source file 602 into a converted file 604. For example, the file converter 214 of FIG. 2 may create a symbol file 606 ("S0") associated with the source file 602 that contains each unique symbol found in the source file 602. The file converter 214 may also generate a locality file 608 ("L0") containing each location of each symbol. The analysis component 216 of FIG. 2 may generate a manifest file 610 ("M0") that contains statistics about the source file 602. The data analysis service 210 may store the converted file 604 in a bucket 612 of object storage. The bucket 612 may comprise one or more converted files.

In some examples, the data analysis service 210 may generate an index based on processing of data objects associated with a bucket, such as the example bucket 612. For example, the indexing component 212 of FIG. 2 may generate an index based on the processing of the converted file 604 associated with the bucket 612. In some examples, the data analysis service 210 may generate an index based on the processing of data objects associated with multiple buckets.

For example, the indexing component 212 may generate an index 620 based on processing of data objects associated with a first bucket 612A (e.g., based on the processing of converted files 604A), based on processing of data objects associated with a second bucket 612B (e.g., based on the processing of converted files 604B), and based on processing of data objects associated with a third bucket 612C (e.g., based on the processing of converted files 604C).

As an illustrative example, each of the buckets may be associated with different respective companies. For example, the first bucket 612A may comprise data objects (e.g., the converted files 604A) associated with a first company ("C1"), the second bucket 612B may comprise data objects (e.g., the converted files 604B) associated with a second company ("C2"), and the third bucket 612C (e.g., the converted files 604C) may comprise data objects associated with a third company ("C3").

It may be appreciated that the indexing component 212 may process the data objects associated with a bucket (e.g., all of the data objects associated with the bucket) or may process a subset of data objects associated with a bucket. For example, the indexing component 212 may generate the index 620 based on data objects comprising a data type of only CSV files associated with each of the respective buckets. In another example, the indexing component 212 may generate the index 620 based on the data objects of the CSV files that include customer information. For example, the relevant data objects associated with the first bucket 612A may include the following data source files: "C1-customers.1.csv", "C1-customers.2.csv", and "C1-customers.3.csv".

As shown in FIG. 6, the index 620 may include at least one manifest file (e.g., a manifest file 622) that describes the processing used to create the index 620 as well as the schema. For example, the index 620 may include a manifest file that describes that the data objects correspond to a data type of CSV files that include customer information. Using the customer CSV example, the indexing component 212 may generate a manifest that specifies a source schema of the data source files having six example files: (1) First Name (String); (2) Last Name (String); (3) Street (String); (4) State (String); (5) Sex (String); and (6) Age (Number).

In an aspect, the manifest file 622 includes statistics and metrics about the indexed data, which were compiled during the indexing process. In some aspects, the manifest file 622 may be updated as a result of any refinement or transformation operations performed on the index 620, which may result in the creation of a new manifest.

In some aspects, the manifest file describes the associated manifest, symbol file(s), and locality file(s). For example, in cases where the index is comprised of multiple pairs of symbol files and locality files, the manifest file may specify which of the symbol files is associated with which of the locality files, and that they represent which raw data source (e.g., original CSV file). In the illustrated example of FIG. 6, a mapping between a symbol file and the associated locality file is depicted using bi-directional arrows.

For example, with respect to the converted file 604, the M0 manifest file 610 may specify that the S0 symbol file 606 is associated with the L0 locality file 608 (e.g., via a mapping 607), and that the S0 symbol file 606 and the L0 locality file 608 represent the source file 602. In another example, and with respect to the index 620, an M1 manifest file 622a may specify that an S1 symbol file 624a is associated with an L1 locality file 626a (e.g., via a mapping 625a).

In one implementation, a symbol file and locality file pairing may be represented and encoded using a common file name prefix. For example, the S0 symbol file 606 and the L0 locality file 608 may be represented and encoded using a common file name prefix "srcfile1" (e.g., the S0 symbol file 606 may be represented and encoded as "srcfile1.I2S" and the L0 locality file 608 may be represented and encoded as "srcfile1.L2I").

The example index 620 may include one or more symbol files (e.g., "filename.I2S") that each contain the symbols of the indexed data sources. In some aspects, a symbol file 624 may be arranged similar to the symbols portion 232 described in connection with FIG. 2 and/or the symbol file 304 described in connection with FIG. 3, and may be extended to include information relating to a number of hits. The number of hits specifies the number of times a given symbol occurs within a locality file. In other words, a symbol file has one reference and hits indicate how many times this symbol appears in the locality file (e.g., original raw data representation). The symbol file 624 may have a format of <symbol>:<count>:<delimiter>, <symbol>:<count>:<delimiter>, etc. For example, the example symbol file 304 of FIG. 3 may be extended to include a number of hits and a portion of the extended symbol file corresponding to the locations 4 to 6 may comprise "4:115:217:1".

In an aspect, the search component 218 may perform a symbol lookup on the symbol file 624 for text search and relational queries, for example, to determine a given data source satisfies the text search or criteria of the relational query. In one implementation, the search component 218 may perform a lookup using a binary search algorithm on the ordered listing of symbols in the symbol file to determine whether the underlying data source satisfies text search criteria. For example, to initiate a SEARCH operation for a given text string input, the search component 218 can efficiently perform a search (e.g., a binary search) of the symbols in the symbol file 624 without having to determine the position or location (if any) of the searched-for symbol in the raw data. Thus, the index enables an improved search of data in object storage by providing a threshold question of whether a symbol is present in the index prior to resolving the remainder of the result set. When final materialization is performed subsequent to the final result set being resolved, then the associated locality files can be used in the materialization process to re-create the raw data that satisfied the search queries as the result set.

The index 620 may further include one or more locality files 626 (e.g., "filename.L2I") that each specify the locality of the indexed data source (e.g., where symbols are located). In an aspect, the one or more locality files 626 may be organized into one or more locality rows having a hidden key to represent ordering of the raw or refined data source. In an aspect, the locality files do not contain physical hidden keys, but rather this is a logical concept implemented during execution of searches and queries. The hidden key is a physical order of the raw data indexed, or the logical order based on some searches and/or queries. During searches and/or queries, an array of positions (e.g., a virtual column) is ordered and/or reduced based on the search/query. Once the final array is created (based on the search/query predicates), the array can be used to materialize the results via the locality files and symbol files. The search component 218 may execute a query plan having relational operations or clauses that finalize a returned result set (e.g., ORDER, GROUP, JOIN) using the one or more locality files 626 and without requiring the use of the symbol file 624. In an aspect, such relational operations (e.g., ORDER, GROUP, JOIN) work on the specific column localities. For example, only locality files (and not symbol files) may be used to do an ORDER, GROUP, or JOIN operation(s), until the final materialization is performed to resolve the final result set, at which point, the associated symbol files are used. As discussed above, the same applies to operations such as SEARCH where symbol files may be used (and not locality files), and when the final materialization is performed, then the associated localities may be used.

In an aspect, in response to receiving a search query to execute on the index 620, the search component 218 may be configured to generate a query plan or query execution plan comprising one or more predicates. Each query plan starts with scoping, then the creation of key localities based on the hidden key, that is continually sorted and/or reduced based on database functions, to ultimately be materialized via the symbol and locality files. In one aspect, the search component 218 may process the search query such that each predicate sorts or reduces a hidden key localities array to drive a next predicate. This final hidden key localities array may be used to finalize materialization via the symbol files and the locality files. Accordingly, query planning and its associated database functions are highly optimized due to the hidden key locality information. This information is small and allows for parallel and distributed execution.

Any aspect of the indexing can be changed dynamically. For instance, the size of the symbol files and/or the locality files can be increased, decreased, split, or merged to produce optimal sizes for requested access to the object storage system. For instance, the data analysis system may detect whether two or more index sets have common or related information, and may merge them together to reduce duplication, entropy, and the number of symbol-locality pairs. Merging is dependent on the particular data set indexed, but can greatly reduce the size of the overall logical index, as well as the number of object storage requests to materialize the original dataset.

Referring again to FIG. 6, the manifest file 622 of the index 620 can be arranged in a tree-like data structure that summarizes portions of the manifest for faster access and query execution. In an aspect, for each logical index, there may be a root manifest file (e.g., "M-Root") that describes the topology of the dataset. Manifest files can be summarized and reference other "leaf" manifest files, which can represent an amount of raw data up to a threshold limit (e.g., 200 GB). For example, as each data source (e.g., the source file 602 and/or the converted file 604) is indexed, it is "chunked" into segments. These segments are mapped to their own corresponding manifest (e.g., leaf manifest files) that describes the true physical shape (e.g., "source of truth") such that a master manifest (e.g., the root manifest file) is different from a sub-segment manifest.

The manifest files are configured to scope requests to resolve a particular search and/or query. In other words, the manifest files may be used to determine whether a particular symbol and locality file pair does not have information related to a specific request. The use of such manifest files greatly reduces the number of object storage system access requests that the data analysis service 210 needs to materialize a result.

In some cases, one summarized manifest file may determine that a particular search or query result set was not in the index 620, and with one object storage request (e.g., an S3 request) resolve the request. In other cases, leaf manifest files can be utilized where a large dataset (e.g., 1 TB of log files) may have at least 10 to 100 MB file accesses to determine whether part of an index set is used (e.g., required) to materialize the result. Therefore, only 1 to 10 access requests of the object storage system is needed to resolve a "non-existent" request. When determining if a symbol is within a symbol and locality file pair via a text search or range within a relational query, the manifest file can also quickly scope such requests. It may be noted that manifest files can be used to not just scope requests, but also to actually resolve a particular search/query based on the internal metadata stored in the manifest file itself.

The next step in scoping is a type of query plan optimization type that includes analysis of whether a particular symbol and locality file pair is required. The search component 218 may access one or more manifest files or symbol files (which are typically a fraction of the size of the locality file) to determine if the overall pair of symbol files and locality files would be used to materialize a result set. In some aspects, the scoping may be driven via manifest file to symbol file to locality file existence-based optimizations. In other words, if it is determined that a symbol file needs to be accessed, it may be concluded that there is a high likelihood that the symbol and locality file pair is required to materialize. For example, if a query or search includes a FIND/UNTIL operation for a particular symbol, the search component 218 may determine that the particular symbol is outside of the scope of symbols within a particular symbol and locality file pair, as defined by minimum and maximum statistics found in the manifest file associated with that particular symbol and locality file pair. In response, the search component 218 can refrain or otherwise exclude from processing the associated symbol file and locality file.

In one aspect, the index 620 may be configured as a distributed index. For example, the index 620 may be arranged in a distributed manner (and not in a monolithic manner) in which the plurality of manifest files, symbol files, and locality files are stored across a plurality of physical buckets within object storage, such as the example first bucket 612A, the second bucket 612B, and the third bucket 612C associated with the index 620. The disclosed indexing techniques can naturally shard or partition without having to specify sharding constraints as in in other technologies. In some aspects, the converted files can be linked or merged to reduce entropy/duplications of information, for example, by merging data edge pairs.

The power of a distributed index (e.g., as shown in connection with the example buckets associated with the index 620) is the ability to index data sources in parallel without reorganizing once the indexing is complete. In some aspects, the data analysis service 210 may execute multiple instances of the indexing component 212 on different worker nodes which process in parallel the raw data sources stored in object storage into symbol files and locality files. A manifest is created at the end that logically "links" the manifest/locality/symbol (M/L/S) pairs. Note that each worker (e.g., instance of an indexing component 212) creates many M/L/S pairs linking the subset to be ultimately linked across all subsets during a final completion. For example, one instance of the indexing component 212 may convert the raw data sources in the first bucket 612A to the corresponding symbol files S1, S2, S3 and locality files L1, L2, L3, while concurrently another instance of the indexing component 212 may convert the raw data sources in another different bucket (e.g., the second bucket 612B) to the corresponding symbol files S4, S5 and locality files L4, L5. Once a worker has completed converting the raw data sources in a particular bucket (e.g., the first bucket 612A) and has created a local manifest file (M1) for that bucket, the indexing component 212 may link this "branch" of the index to the root manifest file (M-Root), for example, by inserting an entry into the root manifest file with a reference to that local manifest file M1. The root manifest file could be stored in one of the first bucket 612A, the second bucket 612B, or in another bucket entirely. This process of building a distributed index is improved over a traditional database with shards because the monolithic index of the traditional database (e.g., typically a b-tree data structure) are merged or ordered due to monolithic or complete order constraints.

Aspects of the described techniques have been configured to optimize around the number of accesses of the object storage system 203. In other words, the data analysis service 210 has been optimized to find information efficiently. The data analysis service 210 internally orders information and can naturally reproduce the original data source order. However, for any relational query requests where multiple columns can define a key specification (e.g., sort order), the locality file may be used (e.g., and not the symbol file), and the symbol file may be used for the final materialization. Therefore, to sort a section of a large dataset (e.g., 1 TB of log files), the scoping will have direct access to the symbol and locality file pairs to resolve the request, where locality files will be first ordered/grouped and symbol files will be used to materialize. The data analysis service 210 also uniquely performs aggregations during this materialization phase.

Figure 7:
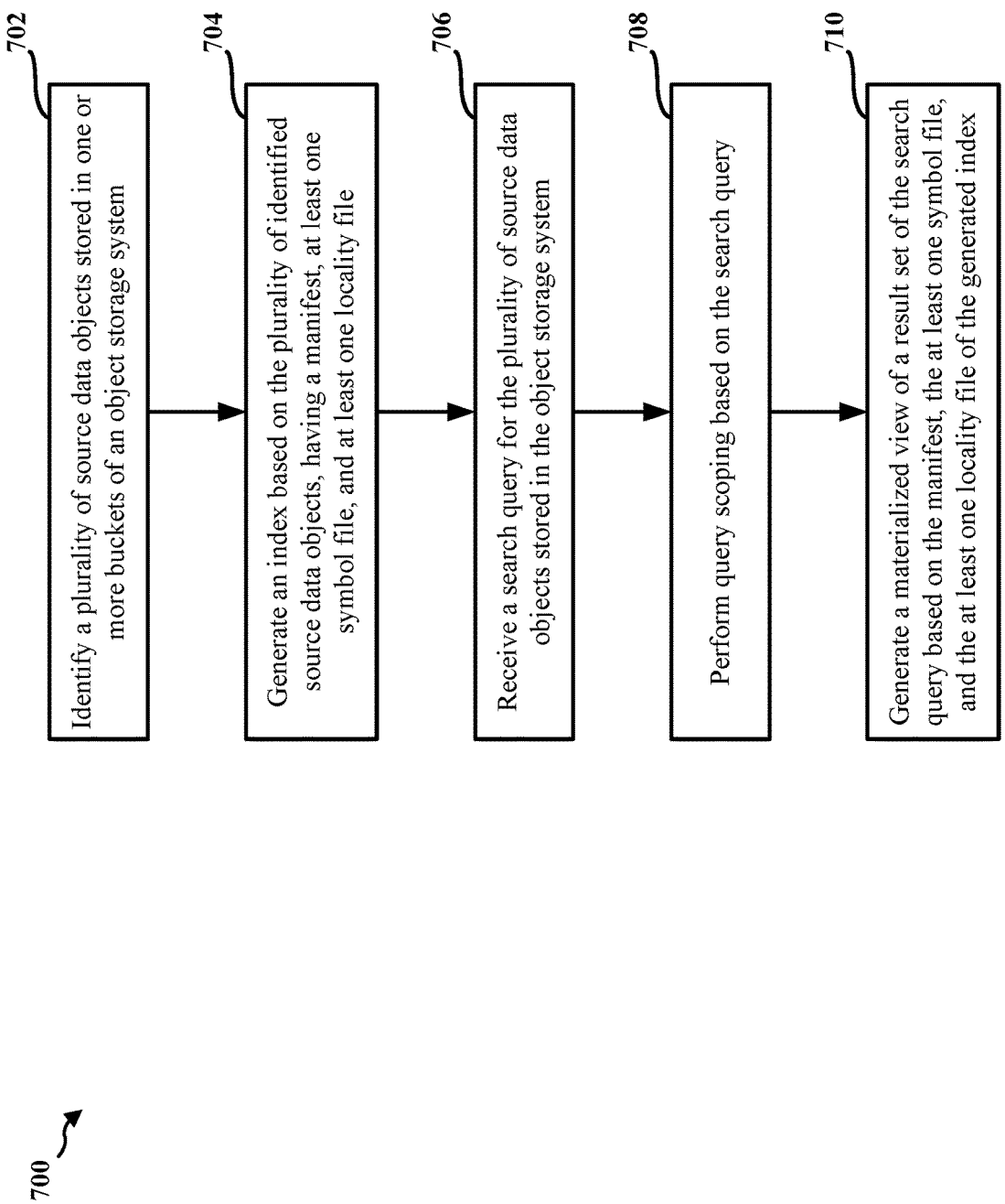
FIG. 7 is a flowchart illustrating a method for searching and querying data in object storage, in accordance with various aspects of the present disclosure.

FIG. 7 is a flowchart illustrating a method 700 for searching and querying data in object storage, as presented herein. The method 700 may be performed by the data analysis service 210, by a sub-component of the data analysis service 210, such as the indexing component 212 or the search component 218, or by the object storage system 203. It is noted that the following description of the example method 700 refers to the example system 200 and components described above in connection with FIG. 2. The method 700 enables text search and analytics queries to be performed on object storage without the expense and additional storage costs of prior approaches, such as data warehousing and ETL processes.

The method 700 begins at step 702, in which a plurality of source data objects stored in one or more buckets of an object storage system is identified. In some aspects, the identified plurality of source data objects is determined based on a grouping specifying a criteria for inclusion in the index. For example, and referring to the example of FIG. 6, the index 620 is based on data objects associated with a data type of CSV files. In some aspects, the source data objects are identified by user input that selects a bucket in which the source data objects are contained. In some use cases, the user may select the bucket for discovery, analysis, and/or indexing. In other aspects, the source data objects are automatically triggered in response to detecting the creation or modification of the data objects in object storage.

At step 704, the indexing component 212 may generate an index based on the plurality of identified source data objects. In an aspect, the index includes a manifest, at least one symbol file, and at least one locality file, as described in connection with the manifest file 622, the symbol file 624, and the one or more locality files 626 of FIG. 6. The manifest may specify a mapping of the at least one symbol file to the corresponding at least one locality file, as described in connection with the mapping 607 and/or the mapping 625 of FIG. 6. In some aspects, the manifest may include a tree-like data structure of leaf manifest files having a root manifest file that summarizes at least one of the leaf manifest files. In an aspect, the symbol file is associated with a first data object of the plurality of source data objects and comprises a sorted unique set of the symbols from the first data object. In some such examples, each of the symbols may be stored at a corresponding location within the symbol file. The locality file that is mapped to the symbol file includes a plurality of location values referencing the corresponding symbol file. A location value at a respective position within the locality file may represent an occurrence in the first data object of a corresponding symbol identified by the respective location value.

At step 706, the data analysis service 210 may receive a search query for the plurality of source data objects stored in the object storage system. For example, the data analysis service 210 may receive the search query 222. In some aspects, the search query may be one of a relational query and a text search.

At step 708, the data analysis service 210 performs query scoping based on the search query. For example, the search component 218 may perform the query scoping to reduce object storage access. In some examples, the search component 218 may parse the manifest file 622 of the index 620 to resolve the search query. For example, when determining if a symbol is within a symbol and locality file pair via a text search or range within a relational query, the manifest file 622 can quickly scope such requests.

In some aspects, the query scoping may be driven via manifest file to symbol file to locality file existence-based optimizations. In other words, if it is determined that a symbol file is to be accessed, it may be concluded that there is a high likelihood that the symbol and locality file pair is required to materialize. For example, if a query or search includes a FIND/UNTIL operation for a particular symbol, the search component 218 may determine that the particular symbol is outside of the scope of symbols within a particular symbol and locality file pair, as defined by minimum and maximum statistics found in the manifest file associated with that particular symbol and locality file pair. In response, the search component 218 can refrain or otherwise exclude from processing the associated symbol file and locality file.

At step 710, the data analysis service 210 generates a materialized view of a result set of the search query based on the manifest, the at least one symbol file, and the at least one locality file of the generated index. In an aspect, the materialized view may be a matrix of columns and rows of data representing an ordered/reduced dataset of one or more converted file matrices of columns and rows. In some aspects, the data analysis service 210 may query the generated index in a sequence order comprised of the manifest, the at least one symbol file, and the at least one locality file. In some aspects, the data analysis service 210 may use the locality file and the symbol file to return a result set based on the location of the symbols in the data source file.

Resolving a search query may include scoping of work and then executing the work. The scoping of work may include identifying specific items of execution. The executing of work may include performing the identified specific items of execution.

As described above, as a data source is indexed, the data sources are "chunked" into segments. When an index becomes large, the number of segments also increases. For example, an index in the order of petabytes may include thousands of segments (e.g., tens of thousands of segments, hundreds of thousands of segments, etc.). The scoping of work in an index (e.g., the identifying of the segment(s) of the index that may resolve the search query) may take seconds, and for a large index (e.g., an index in the order of petabytes), the scoping of work may take upwards of ten seconds. Thus, it may be appreciated that reducing the scoping of work to sub-seconds is beneficial in improving query performance.

Figure 8:
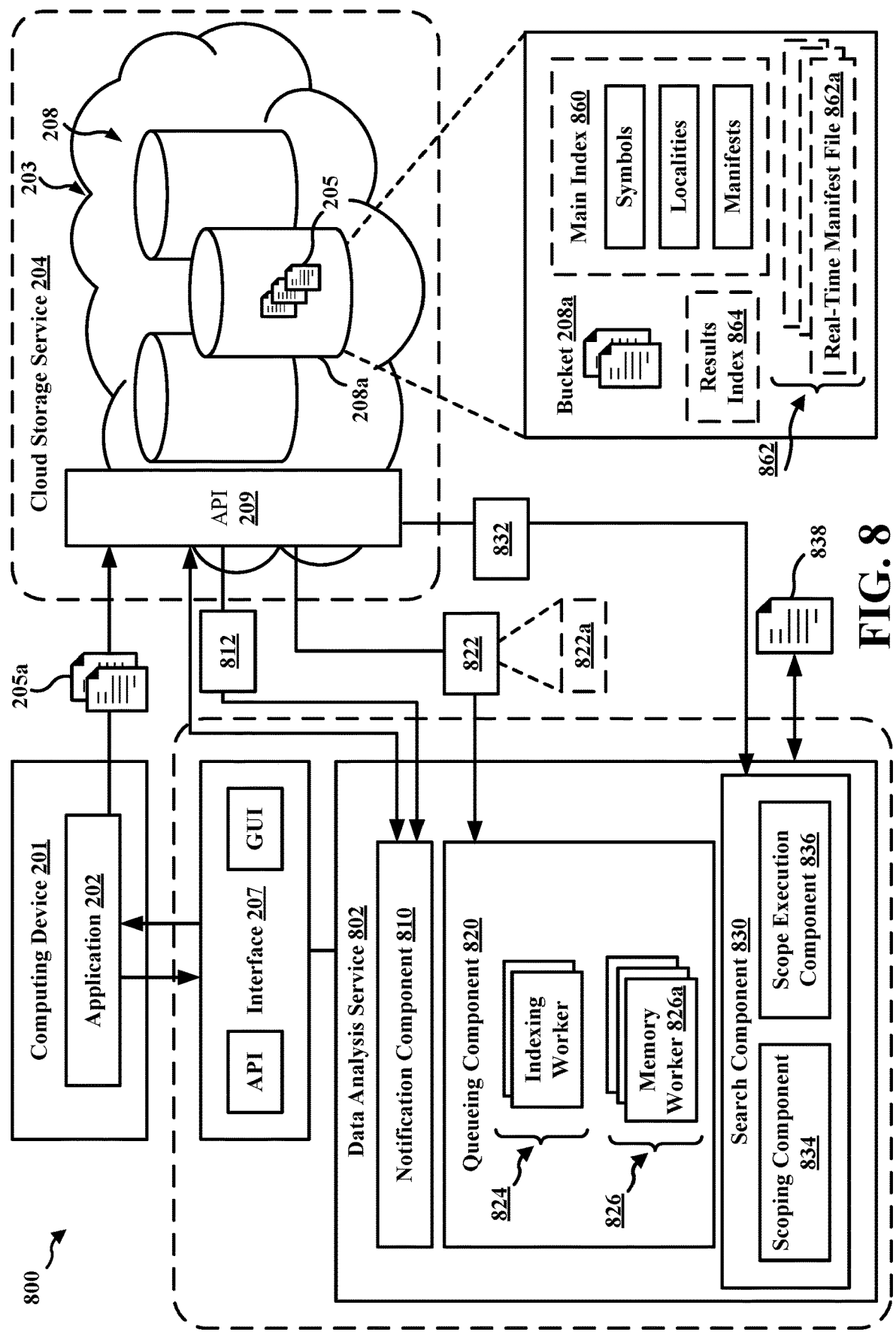
FIG. 8 is a block diagram illustrating a system for real-time indexing of data, in accordance with various aspects of the present disclosure.

FIG. 8 is a block diagram illustrating a system 800 for facilitating real-time indexing of data, as presented herein. The system 800 is similar to the example real-time indexing system 100 described in connection with FIG. 1 and/or the example system 200 described in connection with FIG. 2, except for the inclusion of several components to depict the real-time indexing aspects in greater detail. Similar to the example of FIG. 2, the system 800 includes a computing device 201 executing an application 202 that has stored data 205 in an object storage system 203. The object storage system 203 is configured to store unites of data 205 as objects in a flat organization scheme with logical containers known as buckets.

The system 800 further includes a data analysis service 802, similar to the data analysis service 210 of FIG. 2. The data analysis service 802 is configured to process and analyze the data stored in the object storage system 203. Moreover, the data analysis service 802 is configured to facilitate real-time indexing, as described herein.

In the illustrated example of FIG. 8, the data analysis service 802 includes a notification component 810 configured to register for and get notified when data (e.g., the data 205a) is placed in the object storage system 203. For example, when the application 202 generates or prepares the data 205a for storing, the object storage system 203 obtains the data 205a (e.g., via the API 209). The notification component 810 registers itself with the object storage system 203 so that when data is placed at the object storage system 203, the object storage system 203 transmits a notification 812 that is received by the notification component 810. An example of the notification 812 may be implemented via a distributed message queueing service, such as the Amazon Simple Queue Service (SQS)™. However, other examples may use additional or alternative message queueing services to indicate when data is stored at the object storage system 203.

As shown in FIG. 8, the system 800 leverages the object storage system 203 to perform the ingestion of the data 205a from the application 202. Using the object storage system 203 to ingest the data is more cost efficient and performant than using, for example, memory and processing resources (e.g., CPUs). The storing of the data 205a at the object storage system 203 also simplifies handling of large amounts of data ingestion. As an example, the cost of ingesting one terabyte of data at the object storage system 203 may be one or more magnitudes of order cheaper (e.g., 20 times cheaper) than ingesting the one terabyte of data via memory and processing resources (sometimes referred to herein as a "memory/compute system").

In some examples, while the object storage system 203 provides storage, the object storage system 203 may provide limited compute resources to execute logic. Thus, aspects disclosed herein include compute resources to perform certain aspects associated with the real-time indexing aspects disclosed herein. However, it may be understood that by using the object storage system 203 for data ingestion, the compute resources associated with performing real-time indexing may be reduced compared to memory/compute systems.

Additionally, while a memory/compute system would have to have enough capacity to support the maximum ingest potential of the data 205a, the data analysis service 802 disclosed herein facilitates adjusting the amount of compute resources and/or memory allocated for the real-time indexing of the ingested data. In the illustrated example of FIG. 8, the data analysis service 802 includes a queueing component 820 configured to receive and parse a workload 822 (e.g., the ingested data). As shown in FIG. 8, the queueing component 820 includes one or more indexing workers 824 (e.g., memory and compute resources allocated for data indexing). Aspects of the one or more indexing workers 824 may be implemented by the index parser 106 of FIG. 1 and/or the indexing component 212 described in connection with FIG. 2. For example, the one or more indexing workers 824 may generate at least one main index (e.g., a main index 860) based on one or more data sources of the workload 822, which are similar to the converted file 220 of FIG. 2.

Aspects of the main index 860 may be similar to the index 230 of FIG. 2. For example, the one or more indexing workers 824 may process one or more data sources into the described converted file format, as described in connection with the file converter 214 of FIG. 2. In some examples, the one or more indexing workers 824 may read the raw data from the workload 822 and create the main index 860, which may then be stored back in the object storage system 203.

The main index 860 is an indexed form of the one or more data sources, which is similar to the index 230 of FIG. 2. In some aspects, the one or more indexing workers 824 may analyze one or more data sources and generate statistical information (e.g., a manifest portion), as described in connection with the analysis component 216 of FIG. 2. As described in connection with the example of FIG. 2, the combination of the manifest file (e.g., schema information, statistics, metrics, and other metadata related to the original data source(s) with respect to the main index 860 and/or to the indexing processing performed), the symbol file (e.g., the symbols found in a data source file), and the locality files (e.g., values representing the respective locations of those symbols in the original data sources) associated with the main index 860 may be used to optimize access to object storage, where each component file is used to resolve a materialization request with reduced time, size, and cost metrics (e.g., how long does it take to index a data source, of what size is the resulting index, and at what cost) compared to known techniques.

In one aspect, the manifest file(s) may include statistics and metrics about the indexed data, which were compiled during the indexing process, and may be updated as a result of any refinement or transformation operations performed on the index. Such statistics provide enough information to either resolve a specific request and/or scope (i.e., reduce) object storage access, without accessing the underlying symbol files, locality files, or raw source data, or at least with reduced accesses compared to the known techniques.

In one aspect, the data analysis service 802 may provide a graphical user interface that displays the data sources stored in object storage and that provides an interface through which a user can analyze and run queries on the data sources. The graphical user interface of the data analysis service 802 may enable a user to access the data sources contained in the main index 860, rather than be limited to displaying the content of each of the individual physical buckets (e.g., the plurality of buckets 208 of FIG. 2). After data source(s) have been indexed and published, the data analysis service 802 may use the indexes to display statistics related to the underlying data sources, as well as provide user interface elements for the submission of a search query to be executed on the data index.

In an aspect, the data analysis service 802 may create an initial main index of object data having a schema and sort order corresponding to the lossless state of the original raw sources (e.g., the data 205). In other words, the materialization of this index, which is akin to a relational database generalized selection (i.e., "SELECT *"), will reproduce the exact raw source state of the data 205.

In another aspect, the main index 860 may be refined using one more transformation operations, which can be seen as a new index that can be analyzed and/or used as another index to be refined again. For example, the main index 860 may be transformed by a change in schema types (e.g., columns), a change in schema type names, a change in the order or shape of the schema, a change in the data set sort order by type, or an aggregation or correlation between two or more indexes. The transformed index may be implemented by a modification to the existing manifest or creation of a new manifest, while the linked-to symbol files and locality files remain unchanged. In an aspect, transformations may be considered as descriptions where each description can be applied in sequence to produce the desired data set. Each transformation operation may be executed on-demand. That is, a new manifest file that describes or specifies new transformations, aggregations, correlations, or sort orders, and any combination thereof can be executed on the symbol files and the locality files dynamically and in a desired sequence to produce a particular data set.

As shown in FIG. 8, the system 800 includes a search component 830 configured to receive one or more search queries 832 for the data stored in one or more main indexes (e.g., the main index 860). In some aspects, a search query may be one of a relational query and a text search. The search component 830 is configured to execute the one or more search queries 832 on data using the main index 860, including an analysis of the manifest files, the symbol files, and the locality files associated with the main index 860. The unique arrangement and structure of the data structures in the main index 860 advantageously enable the described system to quickly perform such operations on data stored in object storage compared to known techniques.

In an aspect, the search component 830 may be configured to scope the one or more search queries 832. For example, the search component 830 of FIG. 8 includes a scoping component 834 that is configured to select one or more segments of the main index 860 on which to execute. The scoping component 834 (sometimes referred to as a "query planner") may use the manifest files to scope (i.e., reduce) the object storage access. For example, the scoping component 834 may use the manifest files associated with the main index 860 to determine where the data is, which then allows the search component 830 to efficiently fetch the particular symbol files and/or locality files that can resolve the one or more search queries 832. For example, by parsing the metadata and statistics contained in the manifest file associated with the main index 860, the scoping component 834 may determine whether the one or more symbol files and/or the one or more locality files associated with the respective manifest file can provide the answer to the one or more search queries 832. In an aspect, the scoping component 834 performs a "full" scope of the main index 860 to identify each of the relevant segments of the main index 860 (e.g., the one or more segments that can provide the answer to the one or more search queries 832).

The search component 830 may be further configured to execute the scope. For example, the search component 830 of FIG. 8 includes a scope execution component 836 that is configured to execute the full scope of the main index 860 to resolve the one or more search queries 832. The scope execution component 836 may use the symbol files and the locality files associated with the segments selected by the scoping component 834 to retrieve data from the source data (e.g., a result set 838). In an aspect, resolving the one or more search queries 832 may include generating a materialized view of the result set 838.

In some examples, to facilitate efficiently improving query performance, the example search component 830 may be configured to improve query performance by reducing a "scope time" associated with performing a full scope of a subsequent search query. For example, the search component 830 may be configured to generate a results manifest file that associates the segments selected by the scoping component 834 to the one or more search queries 832. The search component 830 may store the results manifest file in persistent memory. In some examples, a manifest file may comprise a state identifier to indicate a results state of the respective manifest file. For example, the search component 830 may set the state identifier of a results manifest file to a value indicating that the respective manifest file is a results manifest file. The results manifest file may enable the data analysis service 802 to refrain from performing a full scope of a search query by enabling the scoping component 834 to select the segments associated with the results manifest file as the scoped segments. For example, the scoping component 834 may first parse the state identifiers of the manifest files to find a subset of manifest files that correspond to results manifest files. The scoping component 834 may then use the subset of manifest files (e.g., the manifest files corresponding to the results manifest files) to select the segments when performing a scope of the search query.

The example search component 830 may be further configured to improve query performance by reducing an "execution time" associated with executing the scope. For example, the scope execution component 836 may be configured to improve query performance by reducing the time associated with executing the scope. For example, the scope execution component 836 may be configured to store the results of the one or more search queries 832 in a results index 864. The results index 864 may store the results from previous search queries. Moreover, in some examples, the scope execution component 836 may group subsets of the results into scope groups and generate a unique identifier for each of the scope groups. The scope execution component 836 may store the unique identifier and the results associated with each scope group in the results index 864.

To improve latency of data availability associated with real-time indexing, the queueing component 820 includes one or more memory workers 826 (e.g., memory and compute resources allocated for facilitating real-time availability to new data). The one or more memory workers 826 may be configured to make the data sources of the workload 822 available for analysis in real-time. For example, the one or more memory workers 826 may be configured to process segments of the workload 822. The one or more memory workers 826 may generate real-time manifest files 862 that associate information related to the original data source(s) with respect to respective segments of the workload 822. For example, the memory worker 826a may generate a real-time manifest file 862a that associates schema information, statistics, metrics, and other metadata related to the original data source(s) with respect to the segments of the workload 822 processed by the memory worker 826a.

The real-time manifest files 862 enable the data analysis service 802 to scope a search query based on the main index 860 and the real-time manifest files 862. For example, the real-time manifest files 862 may enable the scoping component 834 to select the segments associated with a real-time manifest file 862a as the scoped segments for resolving a search query. That is, when the search component 830 receives the one or more search queries 832, the scoping component 834 may use the manifest file(s) associated with the main index 860 (e.g., the indexed data) and the real-time manifest files 862 associated with the workload 822 (e.g., the ingested data) to determine the one or more segments that may resolve the one or more search queries 832. Thus, the ingested data is available in real-time and may be analyzed in real-time. Additionally, the scoping component 834 may attempt to resolve the one or more search queries 832 based on the indexed data and the ingested data.

In some examples, the real-time manifest files 862 may continue to be used to scope a search query until the respective segments are indexed by the one or more indexing workers 824. For example, when the queueing component 820 receives the workload 822, the queueing component 820 may make the workload 822 available to the one or more indexing workers 824 and to the one or more memory workers 826. As the segments of the workload 822 are indexed by the one or more indexing workers 824, the real-time manifest files 862 associated with the respective segments may be deactivated or discarded. In this manner, new data (e.g., the ingested data associated with the data 205a) may be analyzed in real-time along with the previously indexed data (e.g., the data sources associated with the main index 860). Additionally, unused resources associated with the one or more memory workers 826 may be released and made available to other services.

In some examples, the queueing component 820 may scale the quantity of workers (e.g., memory and compute resources) to match the workload 822. That is, based on the notification 812, the queueing component 820 may determine to increase, decrease, or maintain the quantity of memory workers allocated to perform the real-time indexing. For example, based on the workload 822, the queueing component 820 may determine to increase (or "reserve") one or more additional memory workers to facilitate an increase in the amount of ingested data.

Figure 9:
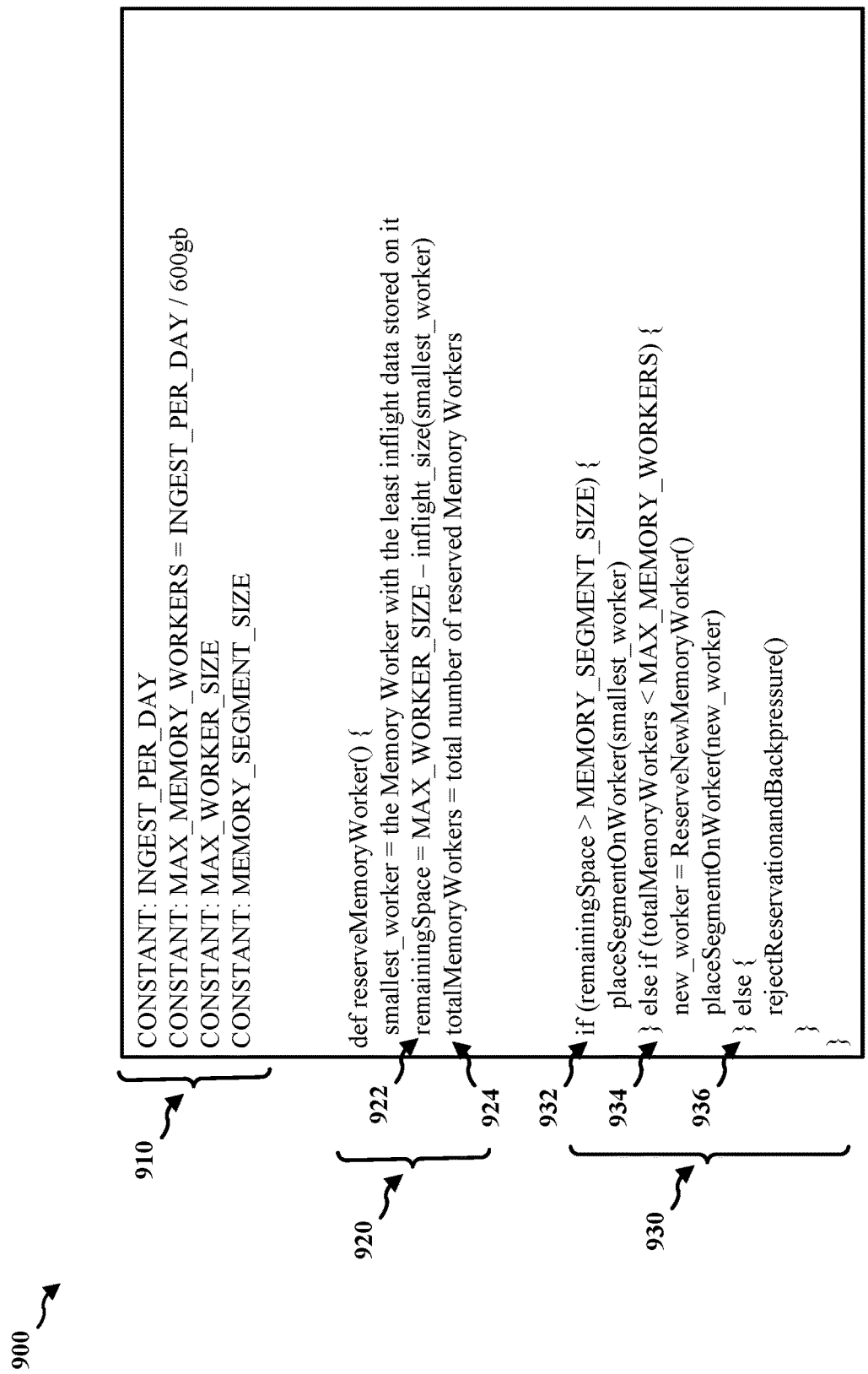
FIG. 9 depicts a listing of pseudocode for reserving caching workers, in accordance with various aspects of the present disclosure.

FIG. 9 depicts a listing 900 of pseudocode describing aspects of the one or more memory workers 826 of FIG. 8, as presented herein. The example listing 900 includes a first portion 910 that defines constant values that may be used to determine when to increase the quantity of memory workers. For example, the first portion 910 includes an "INGEST_PER_DAY" constant, a "MAX_MEMORY_WORKERS" constant, a "MAX_WORKER_SIZE" constant, and a "MEMORY_SEGMENT_SIZE" constant. The INGEST_PER_DAY constant may indicate the approximate data to be indexed per day or the bytes parsed per day. As an example, a single memory worker may have the capability to ingest 10 mb per second of data. The MAX_MEMORY_WORKERS constant may indicate a cap (or maximum quantity) of memory workers that may be reserved at a given time. In some examples, the value of the MAX_MEMORY_WORKERS may be based on the total ingest for a user. For example, the MAX_MEMORY_WORKERS may be based on the INGEST_PER_DAY and a user-configurable value. In example of FIG. 9, the user-configurable value is 600 gb. The MAX_WORKER_SIZE constant may be a system configurable level that controls the amount of data stored on a single memory worker at a given time. For example, a single memory worker may be configured with 600 mb of memory. Segments may be placed on a memory worker based at least in part on the MAX_WORKER_SIZE. In some examples, the amount of data stored on a single memory worker at a given time may be referred to as "inflight data." The MEMORY_SEGMENT_SIZE constant may be a system configurable level that controls the maximum size of a single segment of a workload (e.g., the workload 822 of FIG. 8). For example, space on a memory worker may be made in chunks of the MEMORY_SEGMENT_SIZE and indexed chunks that are larger than the MEMORY_SEGMENT_SIZE may be split. Thus, the MEMORY_SEGMENT_SIZE may refer to a "unit" of reservation. An example memory segment block may be 60 mb of memory.

The example listing 900 also includes a second portion 920 that includes variables that may be used to determine when to increase the quantity of memory workers. For example, the second portion 920 includes a "smallest worker" variable that indicates the memory worker with the least inflight data stored in it. As described, a memory worker may have a MAX_WORKER_SIZE and, thus, the inflight data stored on the memory worker may be more than 0 mb and less than the MAX_WORKER_SIZE. The smallest worker variable identifies a memory worker with the least inflight data of the one or more memory workers in use at a given time.

The second portion 920 also includes a remaining space 922 (e.g., a "remainingSpace" variable) that indicates the space available on the identified smallest worker. For example, the value of the remaining space variable may be based on the MAX_WORKER_SIZE and the amount of data stored on the smallest worker at a given time.

The second portion 920 also includes a total memory workers 924 (e.g., a "totalMemoryWorkers" variable) that indicates the total number of reserved memory workers at a given time. The value of the total memory workers 924 may be greater than 0 and less than the MAX_MEMORY_WORKERS.

The example listing 900 also includes a third portion 930 that corresponds to determining when to place a segment on a current memory worker, when to reserve a new memory worker and to place the segment on the new memory worker, or when to reject placing the segment on a memory worker.

For example, a first section 932 describes determining if the remaining space 922 on the smallest worker is greater than the MEMORY_SEGMENT_SIZE. If the remaining space 922 on the smallest worker is greater than the MEMORY_SEGMENT_SIZE, the queueing component 820 may place the segment on the smallest worker.

A second section 934 describes determining if the total memory workers 924 currently is less than the MAX_MEMORY_WORKERS. If the total memory workers 924 is less than the MAX_MEMORY_WORKERS, the queueing component 820 reserves a new memory worker and places the segment on the new memory worker.

A third section 936 describes rejecting the segment when the remaining space 922 on the smallest worker is less than or equal to the MEMORY_SEGMENT_SIZE and the total memory workers 924 is greater than or equal to the MAX_MEMORY_WORKERS. If the remaining space 922 is less than or equal to the MEMORY_SEGMENT_SIZE and the total memory workers 924 is greater than or equal to the MAX_MEMORY_WORKERS, the queueing component 820 may reject placing the segment on the one or more memory workers.

Figure 10:
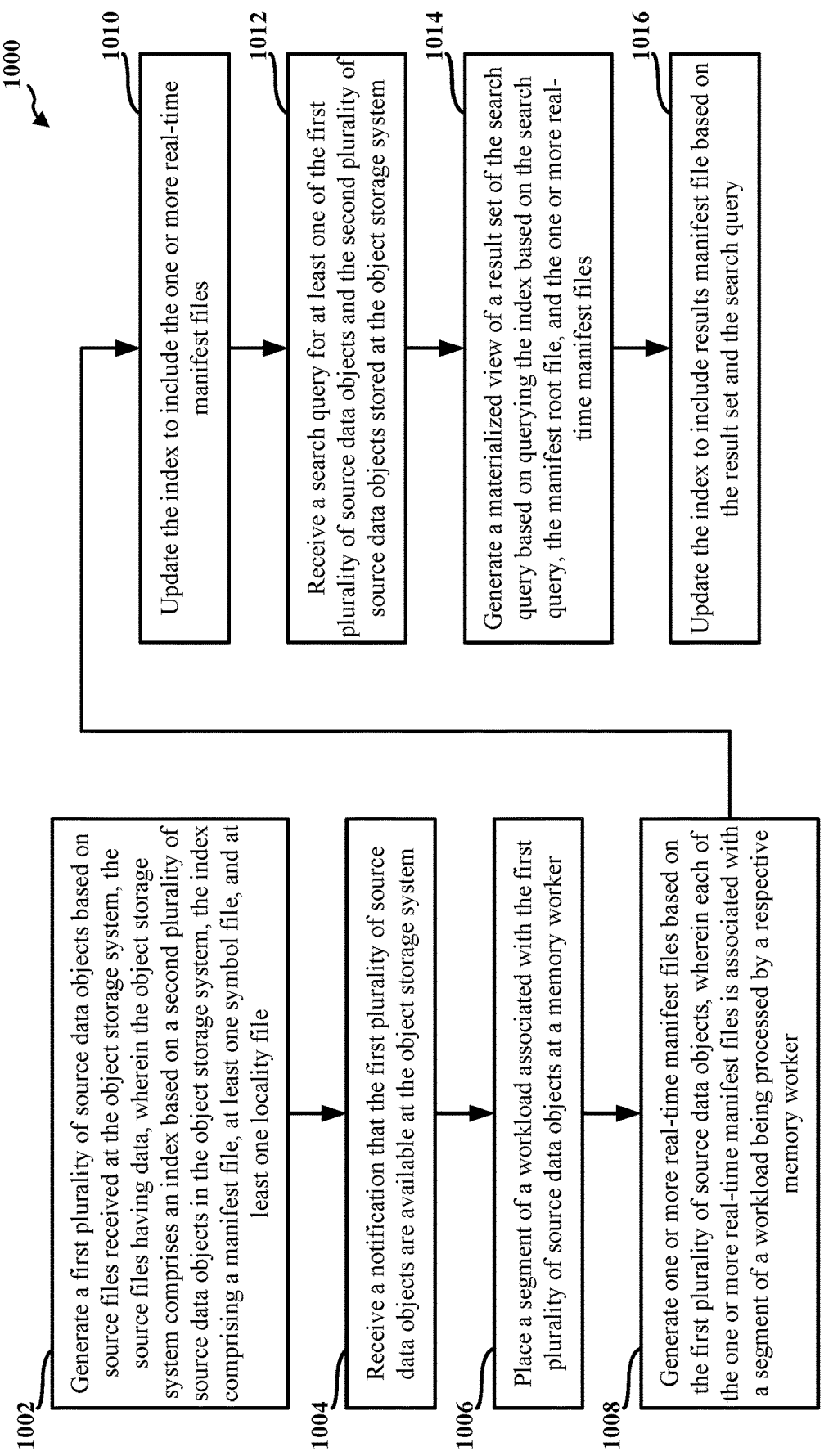
FIG. 10 includes a flowchart of a method for real-time indexing including various aspects of the present disclosure.

FIG. 10 is a method 1000 of real-time indexing of data ingested in object storage, in accordance with aspects presented herein. The method 1000 may be performed by the data analysis service 802, by the notification component 810, by the queueing component 820 or a component of the queueing component 820, by the search component 830, or by the object storage system 203 of FIG. 8. It is noted that the following description of the example method 1000 refers to the example system 800 and components described above in connection with FIG. 8 and/or FIG. 9. The method 1000 for real-time indexing of data ingested in object storage enables improved latency of data availability in object storage.

At step 1002, the data analysis service generates, at an object storage system, a first plurality of source data objects based on source files received at the object storage system, the source files having data, as described in connection with the object storage system 203 of FIG. 8. The object storage system may comprise an index based on a second plurality of source data objects in the object storage system, the index comprising a manifest file, at least one symbol file, and at least one locality file, as described in connection with the main index 860 of FIG. 8.

At step 1004, the data analysis service may receive a notification that the first plurality of source data objects are available at the object storage system, as described in connection with the notification 812 of FIG. 8. The notification 812 may indicate that data has been placed at the object storage system 203. For example, the notification component 810 may register itself with the object storage system 203 so that when data is placed at the object storage system 203, the object storage system 203 transmits a notification 812 that is received by the notification component 810. An example of the notification 812 may be implemented via a distributed message queueing service, such as the Amazon Simple Queue Service (SQS)™. However, other examples may use additional or alternative message queueing services to indicate when data is stored at the object storage system 203.

At step 1006, the data analysis service may place a segment of a workload associated with the first plurality of source data objects at a memory worker, as described in connection with the example one or more memory workers 826 of FIG. 8 and the example of FIG. 9. Aspects of step 1006 are described in connection with an example method 1100 of FIG. 11.

At step 1008, the data analysis service generates one or more real-time manifest files based on the first plurality of source data objects, as described in connection with the example real-time manifest file 862a of FIG. 8. For example, each memory worker of the one or more memory workers 826 may generate one or more real-time manifest files. In some examples, each of the one or more real-time manifest files may be associated with segments of a workload 822 being processed by a respective memory worker. For example, the memory worker 826a may include inflight data corresponding to the new segment 822a. In such examples, the real-time manifest file 862a may be based on the new segment 822a of the workload 822.

At step 1010, the data analysis service updates the index to include the one or more real-time manifest files. For example, the data analysis service 802 may update the main index 860 to include the real-time manifest files 862 generated by the one or more memory workers 826.

At step 1012, the data analysis service may receive a search query for at least one of the first plurality of source data objects and the second plurality of source data objects stored at the object storage system. For example, the data analysis service 802 may receive the one or more search queries 832. In some aspects, the search query may be one of a relational query and a text search.

At step 1014, the data analysis service generates a materialized view of a result set of the search query based on querying the index. In some examples, the data analysis service 802 may query the index based on the search query, the manifest root file, and the one or more cached manifest files. Additionally, or alternatively, the data analysis service may query at least one symbol file and/or at least one locality file of the index to generate the result set. In an aspect, the materialized view may be a matrix of columns and rows of data representing an ordered/reduced dataset of one or more converted file matrices of columns and rows.

At step 1016, the data analysis service may update the index to include a results manifest file based on the result set and the search query. In some examples, the data analysis service may store the results manifest file in the results index 864. Additionally, when executing a subsequent search query, the data analysis search may execute the subsequent search query by querying the index, including the main index 860, the results index 864, and the real-time manifest files 862.

Figure 11:
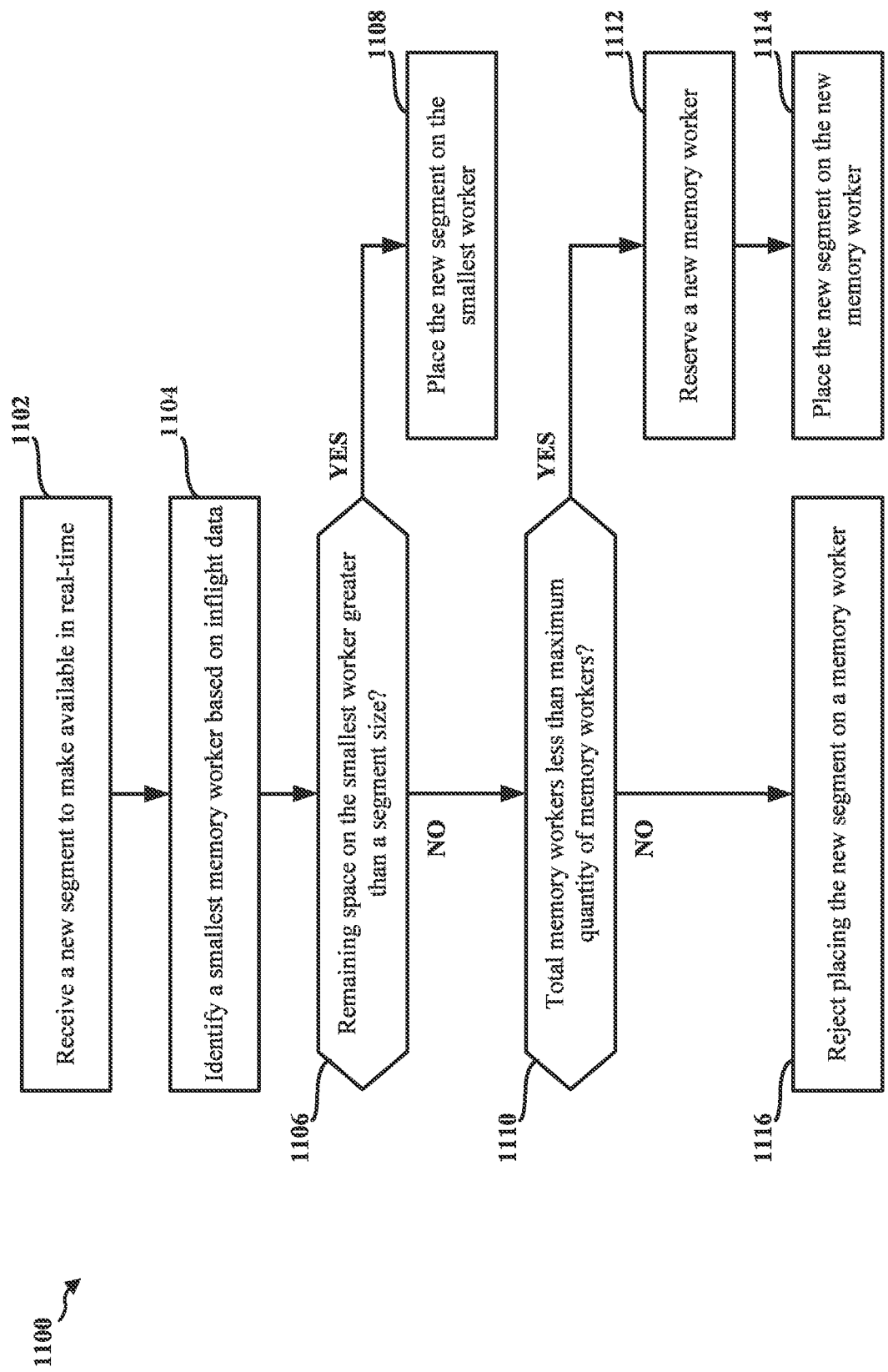
FIG. 11 includes a flowchart of a method for making a segment of a workload available for analysis in real-time, in accordance with various aspects of the present disclosure.

FIG. 11 is a flowchart illustrating a method 1100 for making a segment of a workload available for analysis in real-time, as presented herein. The method 1100 may be performed to implement step 1006 of FIG. 10.

At step 1102, the queueing component 820 receives a new segment to make available in real-time. For example, the queueing component 820 may identify that the workload 822 includes a new segment 822a.

At step 1104, the queueing component 820 identifies a smallest memory worker based on inflight data. For example, the queueing component 820 may check the inflight data of each of the one or more memory workers 826 and identify that the memory worker 826a has the smallest inflight data.

At step 1106, the queueing component 820 determines if the remaining space on the smallest worker is greater than a segment size. For example, the queueing component 820 may determine the remaining space 922 of the memory worker 826a and compare the remaining space 922 to the MEMORY_SEGMENT_SIZE.

If, at step 1106, the queueing component 820 determines that the remaining space on the smallest worker is greater than the segment size, then, at step 1108, the queueing component 820 places the new segment on the smallest worker. For example, the queueing component 820 may place the new segment 822a on the memory worker 826a.

Aspects of step 1106 and step 1108 may implemented by the first section 932 of FIG. 9.

Returning to step 1106, if the queueing component 820 determines that the remaining space on the smallest worker is less than or equal to the segment size, then, at step 1110, the queueing component 820 determines if the total number of memory workers is less than the maximum quantity of memory workers. For example, the queueing component 820 may determine the total memory workers 924 and compare the total memory workers 924 to the maximum quantity of memory workers (e.g., MAX_MEMORY_WORKERS).

If, at step 1110, the queueing component 820 determines that the total number of memory workers (e.g., total memory workers 924) is less than the maximum quantity of memory workers, then, at step 1112, the queueing component 820 reserves a new memory worker. At step 1114, the queueing component 820 places the new segment on the new memory worker.

Aspects of step 1110, step 1112, and step 1114 may be implemented by the second section 934 of FIG. 9.

Returning to step 1116, if the queueing component 820 determines that the total number of memory workers is greater than or equal to the maximum quantity of memory workers, then, at step 1116, the queueing component 820 determines to reject placing the new segment on a memory worker. In such examples, the data of the new segment may be unavailable for analysis in real-time.

Figure 12:
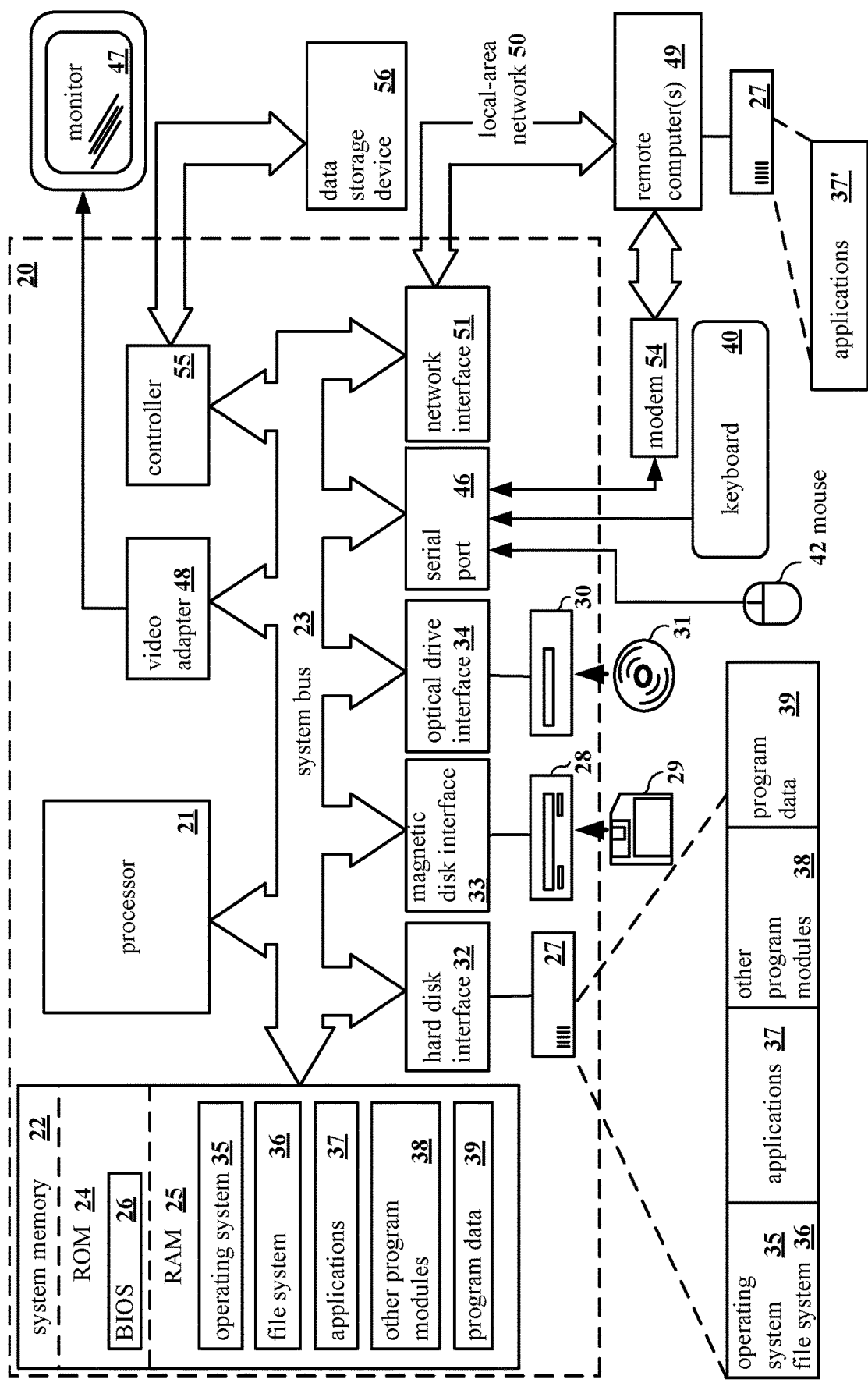
FIG. 12 is a block diagram of a computer system on which the disclosed system and method can be implemented, in accordance with various aspects of the present disclosure.

FIG. 12 is a block diagram illustrating a computer system 20 (e.g., a general-purpose computer system) on which aspects of systems and methods for processing files stored in object storage systems may be implemented in accordance with an example aspect. The computer system 20 can correspond to the computing device 201, the object storage system 203, the computing device and the physical server(s) on which the data analysis service 104 and/or the data analysis service 802 is executing, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (e.g., ROM 24) and random-access memory (e.g., RAM 25). The basic input/output system (e.g., BIOS 26) may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An example aspect comprises a system that uses a hard disk 27, removable magnetic disks 29, and removable optical disks 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The one or more remote computers 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (e.g., a LAN 50) and a wide-area computer network (WAN). Such networks are used in corporate computer networks and internal company networks, and they generally have access to the Internet. In LAN or WAN networks, the computer system 20 is connected to the LAN 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with particular functions facilitated by hardware alone, and other functions facilitated by a combination of hardware and software. In particular implementations, at least a portion, and in some cases, all, of a module may be executed on the processor of a general purpose computer. Accordingly, each module may be realized in a variety of suitable configurations, and should not be limited to any particular implementation exemplified herein.

In one configuration, the data analysis service 104, the data analysis service 802, and/or the computer system 20, and in particular, the file system 36 and/or the central processing unit 21, includes means for generating, at an object storage system, a first plurality of source data objects based on source files received at the object storage system, the source files having data, wherein the object storage system comprises an index based on a second plurality of source data objects in the object storage system, the index comprising a manifest file, at least one symbol file, and at least one locality file. The data analysis service 104, the data analysis service 802, and/or the computer system 20 also includes means for generating one or more real-time manifest files based on the first plurality of source data objects, wherein each of the one or more real-time manifest files is associated with a segment of a workload being processed by a respective memory worker, the workload being based on the first plurality of source data objects. The data analysis service 104, the data analysis service 802, and/or the computer system 20 also includes means for updating the index to include the one or more real-time manifest files. The data analysis service 104, the data analysis service 802, and/or the computer system 20 also includes means for receiving a search query for at least one of the first plurality of source data objects and the second plurality of source data objects stored at the object storage system. The data analysis service 104, the data analysis service 802, and/or the computer system 20 also includes means for generating a materialized view of a result set of the search query based on querying the index based on the search query, the manifest file, and the one or more real-time manifest files.

In another configuration, the data analysis service 104, the data analysis service 802, and/or the computer system 20 also includes means for receiving a notification that the first plurality of source data objects are available at the object storage system, where generating the one or more real-time manifest files is based in part on the notification.

In another configuration, the data analysis service 104, the data analysis service 802, and/or the computer system 20 also includes means for identifying a first segment of the workload. The data analysis service 104, the data analysis service 802, and/or the computer system 20 also includes means for identifying a first memory worker of a set of memory workers, the first memory worker being associated with a smallest volume of inflight data of the set of memory workers. The data analysis service 104, the data analysis service 802, and/or the computer system 20 also includes means for storing the first segment with the first memory worker when a remaining space of the first memory worker is greater than a segment size associated with the first segment.

In another configuration, the data analysis service 104, the data analysis service 802, and/or the computer system 20 also includes means for reserving a new memory worker when a total memory workers quantity of the set of memory workers is less than a maximum memory workers quantity. The data analysis service 104, the data analysis service 802, and/or the computer system 20 also includes means for storing the first segment with the new memory worker.

In another configuration, the data analysis service 104, the data analysis service 802, and/or the computer system 20 also includes means for rejecting storing the first segment at a memory worker of the set of memory workers (1) when the remaining space of the first memory worker is less than the segment size associated with the first segment, and (2) when the total memory workers quantity of the set of memory workers is equal to the maximum memory workers quantity.

In another configuration, the data analysis service 104, the data analysis service 802, and/or the computer system 20 also includes means for generating a results manifest file linking the search query to the result set of the search query. The data analysis service 104, the data analysis service 802, and/or the computer system 20 also includes means for updating the index to include the results manifest file.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents. In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for storing data in object storage, comprising:

generating, at an object storage system, a first plurality of source data objects based on source files received at the object storage system, the source files corresponding to new data, wherein the object storage system comprises an index based on a second plurality of source data objects in the object storage system, the index comprising a manifest file associated with indexed source data objects at the object storage system, at least one symbol file, and at least one locality file;

generating one or more real-time manifest files based on the first plurality of source data objects, the one or more real-time manifest files associated with non-indexed source data objects, wherein each of the one or more real-time manifest files is associated with a segment of a workload being processed by a respective memory worker, the workload being based on the first plurality of source data objects;

updating the index to include the one or more real-time manifest files;

generating one or more converted files based on the first plurality of source data objects, wherein each of the one or more converted files is associated with a portion of the workload processed by a respective indexing worker;

receiving a search query for at least one of the first plurality of source data objects and the second plurality of source data objects stored at the object storage system; and generating a materialized view of a result set of the search query based on querying the index based on the search query, the manifest file associated with the indexed source data objects, and the one or more real-time manifest files associated with the non-indexed source data objects.

2. The computer-implemented method of claim 1, further comprising:
receiving a notification that the first plurality of source data objects are available at the object storage system, wherein generating the one or more real-time manifest files is based in part on the notification.

3. The computer-implemented method of claim 1, further comprising:
identifying a first segment of the workload;
identifying a first memory worker of a set of memory workers, the first memory worker being associated with a smallest volume of inflight data of the set of memory workers; and
storing the first segment with the first memory worker when a remaining space of the first memory worker is greater than a segment size associated with the first segment.

4. The computer-implemented method of claim 3, further comprising:
reserving a new memory worker when a total memory workers quantity of the set of memory workers is less than a maximum memory workers quantity; and
storing the first segment with the new memory worker.

5. The computer-implemented method of claim 4, further comprising:
rejecting storing the first segment at a memory worker of the set of memory workers (1) when the remaining space of the first memory worker is less than the segment size associated with the first segment, and (2) when the total memory workers quantity of the set of memory workers is equal to the maximum memory workers quantity.

6. The computer-implemented method of claim 1, wherein each memory worker is associated with compute resources and memory.

7. The computer-implemented method of claim 1, wherein the object storage system comprises persistent memory.

8. The computer-implemented method of claim 1, further comprising:
generating a results manifest file linking the search query to the result set of the search query; and
updating the index to include the results manifest file.

9. A computer apparatus for storing data in object storage, comprising:
a memory; and
at least one processor coupled to the memory and configured to:
generate, at an object storage system, a first plurality of source data objects based on source files received at the object storage system, the source files corresponding to new data, wherein the object storage system comprises an index based on a second plurality of source data objects in the object storage system, the index comprising a manifest file associated with indexed source data objects at the object storage system, at least one symbol file, and at least one locality file;
generate one or more real-time manifest files based on the first plurality of source data objects, the one or more real-time manifest files associated with non-indexed source data objects, wherein each of the one or more real-time manifest files is associated with a segment of a workload being processed by a respective memory worker, the workload being based on the first plurality of source data objects;
update the index to include the one or more real-time manifest files;
generate one or more converted files based on the first plurality of source data objects, wherein each of the one or more converted files is associated with a portion of the workload processed by a respective indexing worker;
receive a search query for at least one of the first plurality of source data objects and the second plurality of source data objects stored at the object storage system; and
generate a materialized view of a result set of the search query based on querying the index based on the search query, the manifest file associated with the indexed source data objects, and the one or more real-time manifest files associated with the non-indexed source data objects.

10. The computer apparatus of claim 9, wherein the at least one processor is further configured to:
receive a notification that the first plurality of source data objects are available at the object storage system, wherein generating the one or more real-time manifest files is based in part on the notification.

11. The computer apparatus of claim 9, wherein the at least one processor is further configured to:
identify a first segment of the workload;
identify a first memory worker of a set of memory workers, the first memory worker being associated with a smallest volume of inflight data of the set of memory workers; and
store the first segment with the first memory worker when a remaining space of the first memory worker is greater than a segment size associated with the first segment.

12. The computer apparatus of claim 11, wherein the at least one processor is further configured to:
reserve a new memory worker when a total memory workers quantity of the set of memory workers is less than a maximum memory workers quantity; and
store the first segment with the new memory worker.

13. The computer apparatus of claim 12, wherein the at least one processor is further configured to:
reject storing the first segment at a memory worker of the set of memory workers (1) when the remaining space of the first memory worker is less than the segment size associated with the first segment, and (2) when the total memory workers quantity of the set of memory workers is equal to the maximum memory workers quantity.

14. The computer apparatus of claim 9, wherein each memory worker is associated with compute resources and memory.

15. The computer apparatus of claim 9, wherein the object storage system comprises persistent memory.

16. The computer apparatus of claim 9, wherein the at least one processor is further configured to:
generate a results manifest file linking the search query to the result set of the search query; and
update the index to include the results manifest file.

17. A non-transitory computer-readable medium storing computer executable code for caching in object storage, comprising code to:
generate, at an object storage system, a first plurality of source data objects based on source files received at the object storage system, the source files corresponding to new data, wherein the object storage system comprises an index based on a second plurality of source data objects in the object storage system, the index comprising a manifest file associated with indexed source data objects at the object storage system, at least one symbol file, and at least one locality file;

generate one or more real-time manifest files based on the first plurality of source data objects, the one or more real-time manifest files associated with non-indexed source data objects, wherein each of the one or more real-time manifest files is associated with a segment of a workload being processed by a respective memory worker, the workload being based on the first plurality of source data objects;

update the index to include the one or more real-time manifest files;

generate one or more converted files based on the first plurality of source data objects, wherein each of the one or more converted files is associated with a portion of the workload processed by a respective indexing worker;

receive a search query for at least one of the first plurality of source data objects and the second plurality of source data objects stored at the object storage system; and generate a materialized view of a result set of the search query based on querying the index based on the search query, the manifest file associated with the indexed source data objects, and the one or more real-time manifest files associated with the non-indexed source data objects.

18. The non-transitory computer-readable medium of claim 17, wherein the code is further configured to:
receive a notification that the first plurality of source data objects are available at the object storage system,
wherein generating the one or more real-time manifest files is based in part on the notification.

19. The non-transitory computer-readable medium of claim 17, wherein the code is further configured to:
identify a first segment of the workload;
identify a first memory worker of a set of memory workers, the first memory worker being associated with a smallest volume of inflight data of the set of memory workers; and
store the first segment with the first memory worker when a remaining space of the first memory worker is greater than a segment size associated with the first segment.

20. The non-transitory computer-readable medium of claim 19, wherein the code is further configured to:
reserve a new memory worker when a total memory workers quantity of the set of memory workers is less than a maximum memory workers quantity;
store the first segment with the new memory worker; and
reject storing the first segment at a memory worker of the set of memory workers (1) when the remaining space of the first memory worker is less than the segment size associated with the first segment, and (2) when the total memory workers quantity of the set of memory workers is equal to the maximum memory workers quantity.

* * * * *